(12) United States Patent
Zhang et al.

(10) Patent No.: US 12,490,156 B2
(45) Date of Patent: Dec. 2, 2025

(54) METHOD FOR RECEIVING AND SENDING CONTROL SIGNALING, AND COMMUNICATION NODE

(71) Applicant: ZTE CORPORATION, Shenzhen (CN)

(72) Inventors: Shujuan Zhang, Shenzhen (CN); Zhaohua Lu, Shenzhen (CN); Bo Gao, Shenzhen (CN); Chuangxin Jiang, Shenzhen (CN); Yu Ngok Li, Shenzhen (CN); Hao Wu, Shenzhen (CN); Shuaihua Kou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 390 days.

(21) Appl. No.: 17/799,873

(22) PCT Filed: Feb. 5, 2021

(86) PCT No.: PCT/CN2021/075439
§ 371 (c)(1),
(2) Date: Aug. 15, 2022

(87) PCT Pub. No.: WO2021/160028
PCT Pub. Date: Aug. 19, 2021

(65) Prior Publication Data
US 2023/0078059 A1    Mar. 16, 2023

(30) Foreign Application Priority Data
Feb. 14, 2020 (CN) .................... 202010093882.6

(51) Int. Cl.
*H04W 36/00* (2009.01)

(52) U.S. Cl.
CPC ... *H04W 36/0085* (2018.08); *H04W 36/0058* (2018.08); *H04W 36/0061* (2013.01)

(58) Field of Classification Search
CPC ......... H04W 36/0085; H04W 36/0058; H04W 36/0061
See application file for complete search history.

(56) References Cited

U.S. PATENT DOCUMENTS

| | | | |
|---|---|---|---|
| 2013/0258874 A1 | 10/2013 | Khoshnevis et al. | |
| 2014/0043988 A1* | 2/2014 | Chen ................ | H04L 1/0026 370/252 |

(Continued)

FOREIGN PATENT DOCUMENTS

| | | |
|---|---|---|
| CN | 102076055 A | 5/2011 |
| CN | 103428759 A | 12/2013 |

(Continued)

OTHER PUBLICATIONS

Ericsson, "Introduction of late drop NGEN-DC, NE-DC and NR-DC", 3GPP TSG-RAN2 Meeting #106, R2-1908385, May 13, 2019, 46 pages.

(Continued)

*Primary Examiner* — Kevin M Cunningham
(74) *Attorney, Agent, or Firm* — Morgan, Lewis & Bockius LLP

(57) ABSTRACT

Provided are methods for receiving and sending a control signaling, and a communication node. The method for receiving a control signaling includes: receiving first control signaling, where the first control signaling includes a first-type parameter that corresponds to a measurement reference signal, the first-type parameter includes a physical cell identifier (PCI) or includes a PCI and a second-type parameter, and the measurement reference signal includes one of the following: a measurement reference signal in a report configuration of channel state information (CSI), a measurement reference signal with a measurement result included in uplink control information (UCI), a measurement reference signal in a measurement reference signal resource set con- (Continued)

---

Receive a first control signaling, where the first control signaling includes a first-type parameter corresponding to a measurement reference signal, and the first-type parameter includes a physical cell identifier or the first-type parameter includes a physical cell identifier and a second-type parameter — S1010

Determine the measurement reference signal according to the first-type parameter, performing measurement according to the determined measurement reference signal, and report a measurement result through a physical layer — S1020 figured in a serving cell, or, a measurement reference signal in a beam failure candidate reference signal resource set.

20 Claims, 3 Drawing Sheets

(56) References Cited

U.S. PATENT DOCUMENTS

| | | |
|---|---|---|
| 2014/0301337 A1 | 10/2014 | Hapsari et al. |
| 2015/0195763 A1 | 7/2015 | Chen et al. |
| 2016/0278055 A1 | 9/2016 | Park et al. |
| 2019/0059013 A1* | 2/2019 | Rahman ............... H04B 7/0478 |
| 2019/0273637 A1 | 9/2019 | Zhang et al. |
| 2019/0387547 A1 | 12/2019 | Shin et al. |
| 2021/0112508 A1* | 4/2021 | Xiang ..................... H04L 5/005 |
| 2021/0195663 A1* | 6/2021 | Da Silva ........... H04W 36/0058 |
| 2022/0386154 A1* | 12/2022 | Maattanen ............ H04W 24/08 |

FOREIGN PATENT DOCUMENTS

| | | |
|---|---|---|
| CN | 110475257 A | 11/2019 |
| CN | 110535598 A | 12/2019 |
| CN | 110582951 A | 12/2019 |
| CN | 111901837 A | 11/2020 |
| WO | WO 2018/171805 A1 | 9/2018 |
| WO | WO 2019/214333 | 11/2019 |

OTHER PUBLICATIONS

Extended European Search Report of Application No. 21753461.9 dated Feb. 14, 2024, 16 pages.
Office Action for Canadian Application No. 3,171,339, dated Oct. 12, 2023, 4 pages.
International Search Report in application No. PCT/CN2021/075439, dated Apr. 26, 2021, 4 pages including English translation.
Vivo, "Feature lead summary on Enhancements on Multi-TRP inter-cell operation", 3GPP TSG RAN WG1 #104-e R1-2101829, Jan. 25, 2021 (Jan. 25, 2021).
First Office Action in Chinese Application No. 202010093882.6 dated Oct. 24, 2024, 24 pages, including translation.
First Search Report in Chinese Application No. 2020100938826 dated Oct. 20, 2024, 9 pages, including translation.
Nokia et al., "UE CLI measurement configuration and reporting", 3GPP TSG-RAN2#106, R2-1906637, Reno, USA, May 13-17, 2019.
Korean Office Action for Application No. 10-2022-7031760, dated Feb. 24, 2025, 12 pages including translation.

* cited by examiner

Send a first control signaling, where the first control signaling includes a first-type parameter corresponding to a measurement reference signal, and the first-type parameter includes a physical cell identifier or the first-type parameter includes a physical cell identifier and a second-type parameter ~S4010

Send a second control signaling, where the second control signaling includes indication information, and the indication information is used for indicating that the first control signaling includes the first-type parameter corresponding to the measurement reference signal or that the first control signaling includes a serving cell index corresponding to the measurement reference signal ~S4020

FIG. 4

Receive a control signaling, where the control signaling includes a PUCCH resource, the control signaling includes a control signaling for configuring one of a measurement configuration or a measurement link, and one measurement link includes one measurement object and one report configuration ~S5010

FIG. 5

Send a control signaling, where the control signaling includes a PUCCH resource, the control signaling includes a control signaling for configuring one of a measurement configuration or a measurement link, and one measurement link includes one measurement object and one report configuration ~S6010

FIG. 6

Transmit an uplink control signaling, where the uplink control signaling includes a measurement result of a mobility measurement reference signal, and the uplink control signaling includes one of the following: a UCI or a MAC-CE ~S7010

FIG. 7

In a case where a serving cell corresponds to multiple PCIs, select one or more of the multiple PCIs according to a predetermined rule to determine cell measurement information of the serving cell ～S8010

METHOD FOR RECEIVING AND SENDING CONTROL SIGNALING, AND COMMUNICATION NODE

CROSS REFERENCE TO RELATED APPLICATIONS

This is a national stage application filed under 37 U.S.C. 371 based on International Patent Application No. PCT/CN2021/075439, filed Feb. 5, 2021, which claims priority to Chinese Patent Application No. 202010093882.6 filed Feb. 14, 2020, the disclosures of which are incorporated herein by reference in their entireties.

This application claims priority to Chinese Patent Application No. 202010093882.6 filed with the China National Intellectual Property Administration (CNIPA) on Feb. 14, 2020, the disclosure of which is incorporated herein by reference in its entirety.

TECHNICAL FIELD

The present application relates to the field of communication networks and, for example, to methods for receiving and sending a control signaling, and a communication node.

BACKGROUND

Inter-cell mobility management is that a terminal reports a mobility measurement result based on a radio resource control (RRC) signaling. However, in dense cells, for example, in a scenario of high-frequency beam-based communication between cells, an inter-cell handover often occurs, and the delay for a terminal to report the mobility measurement result based on an RRC signaling is too long, affecting the performance of a mobile communication system.

SUMMARY

The present application provides methods for receiving and sending a control signaling, and a communication node, to reduce the report delay of inter-cell measurement results and improve the handover speed of cells.

Embodiments of the present application provide a method for receiving a control signaling, which includes the following.

A first control signaling is received, where the first control signaling includes a first-type parameter corresponding to a measurement reference signal, the first-type parameter includes a physical cell identifier (PCI) or the first-type parameter includes a PCI and a second-type parameter, and the measurement reference signal includes one of the following: a measurement reference signal in a report configuration of channel state information (CSI), a measurement reference signal with a measurement result included in uplink control information (UCI), a measurement reference signal in a measurement reference signal resource set configured in a serving cell, or, a measurement reference signal in a beam failure candidate reference signal resource set.

Embodiments of the present application further provide a method for sending a control signaling, which includes the following.

A first control signaling is sent, where the first control signaling includes a first-type parameter corresponding to a measurement reference signal, the first-type parameter includes a PCI or the first-type parameter includes a PCI and a second-type parameter, and the measurement reference signal includes one of the following: a measurement reference signal in a report configuration of a CSI, a measurement reference signal with a measurement result included in a UCI, a measurement reference signal in a measurement reference signal resource set configured in a serving cell, or, a measurement reference signal in a beam failure candidate reference signal resource set.

Embodiments of the present application further provide a method for receiving a control signaling, which includes the following.

A first control signaling is received, where the first control signaling includes a physical uplink control channel (PUCCH) resource, the first control signaling includes a control signaling for configuring one of a measurement configuration or a measurement link, and one measurement link includes one measurement object and one piece of report configuration.

Embodiments of the present application further provide a method for sending a control signaling, which includes the following.

A first control signaling is sent, where the first control signaling includes a PUCCH resource, the first control signaling includes a control signaling for configuring one of the following: a measurement configuration or a measurement link, and one measurement link includes one measurement object and one piece of report configuration.

Embodiments of the present application further provide a method for transmitting a control signaling, which includes the following.

An uplink control signaling is transmitted, where the plink control signaling includes a measurement result of the measurement reference signal, and the uplink control signaling includes one of the following: a UCI or a media access control-control element (MAC-CE).

Embodiments of the present application further provide a method for determining cell measurement information, which includes the following.

In a case where one serving cell corresponds to multiple PCIs, one or more of the multiple PCIs are selected according to a predetermined rule to determine cell measurement information of the serving cell.

Embodiments of the present application further provide a communication node. The communication node includes a processor and a memory, where the processor is configured to execute program instructions stored in the memory to perform the first one of the methods for receiving a control signaling described above.

Embodiments of the present application further provide a communication node. The communication node includes a processor and a memory, where the processor is configured to execute program instructions stored in the memory to perform the second one of the methods for receiving a control signaling described above.

Embodiments of the present application further provide a communication node. The communication node includes a processor and a memory, where the processor is configured to execute program instructions stored in the memory to perform the first one of the methods for receiving a control signaling described above.

Embodiments of the present application further provide a communication node. The communication node includes a processor and a memory, where the processor is configured to execute program instructions stored in the memory to perform the second one of the methods for receiving a control signaling described above.

Embodiments of the present application further provide a communication node. The communication node includes a processor and a memory, where the processor is configured to execute program instructions stored in the memory to perform the method for transmitting a control signaling described above.

Embodiments of the present application further provide a communication node. The communication node includes a processor and a memory, where the processor is configured to execute program instructions stored in the memory to perform the method for determining cell measurement information described above.

includes the following information: a measurement identifier (MeasID) of this Meas, one measurement object (MeasObject) of this Meas or one piece of report configuration (ReportConfig) of this Meas. That is, one Meas establishes an association relationship between the MeasObject and the ReportConfig. Trigger conditions for reporting inter-cell measurement information are configured in ReportConfig. Configuration elements configured in each MeasObject are as shown in Table 1.

TABLE 1

| Configuration elements configured in MeasObject | Configured values | Meaning of the configuration elements |
| --- | --- | --- |
| ssbFrequency | ARFCN-ValueNR | Frequency domain information where the SSB is located |
| ssbSubcarrierSpacing | SubcarrierSpacing | Subcarrier spacing of the SSB |
| smtc1 | SSB-MTC | SMTC information of the SSB |
| smtc2 | SSB-MTC2 | SMTC information of the SSB |
| refFreqCSI-RS | ARFCN-ValueNR | PointA information of the CSI-RS |
| referenceSignalConfig | ReferenceSignalConfig | CSI-RS configuration information |
| blackCellsToAddModList | One or more PCI-RangeElements | Black cell list information |
| whiteCellsToAddModList | One or more PCI-RangeElements | White cell list information |

In the methods described in the embodiments of the present application, the uplink control signaling includes the mobility measurement result or the CSI measurement reference signal includes the mobility measurement reference signal or one serving cell corresponds to multiple first-type parameters so that the speeds of inter-cell beam measurement report and inter-cell beam handover are equivalent to the speeds of intra-cell beam measurement report and inter-cell beam handover, effectively supporting high-frequency cell handover and dense cells.

BRIEF DESCRIPTION OF DRAWINGS

FIG. 4 is another flowchart of a method for sending a control signaling according to an embodiment;

FIG. 5 is another flowchart of a method for receiving a control signaling according to an embodiment;

FIG. 6 is another flowchart of a method for sending a control signaling according to an embodiment;

FIG. 7 is a flowchart of a method for transmitting a control signaling according to an embodiment;

DETAILED DESCRIPTION

Figure 1:
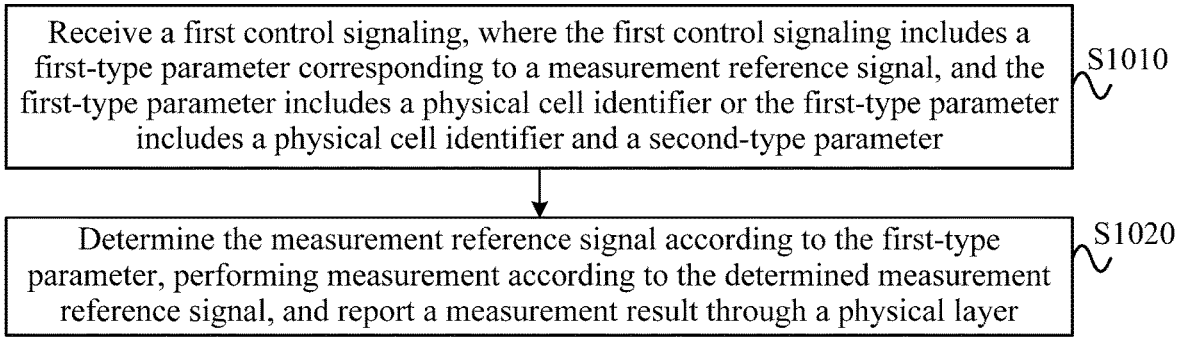
FIG. 1 is a flowchart of a method for receiving a control signaling according to an embodiment.

Embodiments of the present application are described hereinafter in conjunction with drawings.

A base station configures a measurement configuration (MeasConfig) to one terminal through a radio resource control (RRC) signaling. Each cell group corresponds to one MeasConfig. The cell group includes a master cell group (MCG) and a secondary cell group (SCG). The MeasConfig includes one or more measurements (Meas), and one Meas Initial PCI information and the length of the PCI are configured in one PCI range element (PCI-RangeElement), that is, one PCI-RangeElement includes one PCI or multiple consecutive PCIs. The information of the synchronization signal/physical broadcast channel block (SS/PBCH Block, SSB) includes the information of SSBs corresponding to all PCIs in a MeasObject. One frequency domain (such as an SSB frequency (ssbFrequency) in Table 1) corresponds to many PCIs. One frequency domain in a New Radio (NR) protocol corresponds to 1008 PCIs at most, one PCI corresponds to multiple SSBs in the time domain, and SSBs with different time domains are represented by SSB indexes (SSB-Indexes). For example, one PCI corresponds to 64 SSBs in the time domain, and SSBs with different time domain indexes represent different quasi co-location reference signal resources. It can be simply considered that different SSB indexes correspond to different transmit beams of the base station. The SSB sequences sent in 64 time domain SSBs corresponding to one PCI are identical. The SSB sequence includes a primary synchronization signal (PSS) and a second synchronization signal (also called a secondary synchronization signal (SSS)) included in the SSS. One (PSS, SSS) combination corresponds to one PCI. The sequence generation parameters of the PSS and the SSS in the (PSS, SSS) combination include the PCI information. For example, 64 time domain SSB corresponding to PCI1 are sent periodically. For example, if the time domain resource span occupied by the 64 SSBs is 5 ms and the period is 20 ms, there is an SSB in one 5 ms in every four 5 ms. PCI2 and PCI1 in one MeasObject correspond to 64 time domain SSBs, respectively, and the SSBs corresponding to the two PCIs occupy the same time domain resources, but the SSB sequence information is different, that is, different PCIs on the same frequency domain ssbFrequency are code-divided. If SSBs corresponding to different PCIs are sent to the same user equipment (UE) by different nodes, when the transmission delay difference between different nodes and a terminal is quite large (for example, the transmission delay difference exceeds a cyclic prefix (CP) range), even if the transmission time of two nodes is synchronized, different PCIs cannot share a downlink timing, the terminal obtains the downlink timings corresponding to different PCIs based on the SSB corresponding to each PCI, and at this point, the SSBs corresponding to different PCIs may be considered as both code-divided and time-divided.

The configuration element of reference signal configuration (ReferenceSignalConfig) in Table 1 is used for configuring a measurement reference signal included in the MeasObject, and the measurement reference signal hereinafter is referred to as a mobility measurement reference signal. The configuration element of ReferenceSignalConfig includes the configuration elements shown in Table 2.

TABLE 2

| Configuration elements configured in ReferenceSignalConfig | Configured values | Meaning of the configuration elements |
| --- | --- | --- |
| ssb-ConfigMobility | SSB-ConfigMobility | Set of indexes of time domains where SSBs are located, and etc. |
| csi-rs-ResourceConfigMobility | CSI-RS-ResourceConfigMobility | Subcarrier spacing information of the CSI-RS, PCI information corresponding to the CSI-RS, and etc. |

The time domain selection information of SSBs is configured in the SSB mobility configuration (SSB-ConfigMobility) in Table 2. For example, when the maximum number of time domains of SSBs is 64, the base station configures which SSBs among 64 SSBs to be measured for the terminal. For example, which SSBs among the 64 SSBs to be measured for the terminal may be configured using 64 bits, and the terminal only needs to measure 4 SSBs among 64 SSBs in time domain. All PCIs included in this MeasObject in Table 2 share one configuration element of SSB-ConfigMobility. The configuration element of CSI-RS mobility resource configuration (CSI-RS-ResourceConfigMobility) in Table 2 is used for configuring the CSI-RS information included in this MeasObject, and the configuration element of CSI-RS-ResourceConfigMobility includes the configuration elements shown in Table 3.

TABLE 3

| Configuration elements configured in CSI-RS-ResourceConfigMobility | Configured values | Meaning of the configuration elements |
| --- | --- | --- |
| subcarrierSpacing | SubcarrierSpacing | Subcarrier spacing of the CSI-RS |
| csi-RS-CellList-Mobility | One or more CSI-RS-CellMobility | Mobility CSI-RS information corresponding to each cell |
| refServCellIndex-v1530 | ServCellIndex | Serving cell ID referenced by the timing of the CSI-RS resource that is not configured with the associatedSSB element in Table 5 |

The CSI-RS-CellMobility configuration elements in Table 3 include the configuration elements shown in Table 4.

TABLE 4

| Configuration elements configured in CSI-RS-CellMobility | Configured values | Meaning of the configuration elements |
| --- | --- | --- |
| cellId | PhysCellId | Subcarrier spacing of the CSI-RS |
| csi-rs-MeasurementBW | {nrofPRBs, startPRB} | Mobility CSI-RS information corresponding to each cell |
| density | 1 or 3 | Frequency domain density of the CSI-RS |
| csi-rs-ResourceList-Mobility | One or more CSI-RS-Resource-Mobility | One or more Mobility CSI-RS resources corresponding to this CellId (i.e., PCI) |

As can be seen from Tables 3 and 4, channel state information-reference signal (CSI-RS) information corresponding to multiple PCIs is configured in CSI-RS-ResourceConfigMobility, but the subcarrier spacings of CSI-RSs corresponding to these multiple PCIs are the same, and each CSI-RS mobility cell (CSI-RS-CellMobility) corresponds to one PCI (i.e., PhysCellId). Information of a time domain symbol occupied by each Mobility CSI-RS resource, slot information, period information, resource element (RE) information and code domain information are configured in the CSI-RS-Resource-Mobility configuration elements in Table 4, as shown in Table 5.

TABLE 5

| Configuration elements configured in CSI-RS-Resource-Mobility | Configured values | Meaning of the configuration elements |
|---|---|---|
| csi-RS-Index | CSI-RS-Index | Mobility CSI-RS resource index |
| slotConfig | One value in {0~317} | Period and period offset of the mobility CSI-RS resource |
| associatedSSB | {ssb-Index, isQuasiColocated} | Timing of the Mobility CSI-RS resource is based on the timing of the cell corresponding to the cellId configured in CSI-RS-CellMobility, in a case where anassociatedSSB is configured, however, isQuasiColocated is used for configuring that the Mobility CSI-RS resource and the SSB satisfy a quasi co-location relationship |
| frequencyDomainAllocation | Initial RE location | One or more Mobility CSI-RS resources corresponding to the CellId (i.e., PCI) |
| firstOFDMSymbolInTimeDomain | One value of 0 to 13 | Time domain symbol occupied by the CSI-RS in one slot |
| sequenceGenerationConfig | One value of 0 to 1024 | |

FIG. 1 is a flowchart of a method for receiving a control signaling according to an embodiment. As shown in FIG. 1, the method provided in this embodiment includes operations S1010 and S1020.

In operation S1010, a first control signaling is received, where the first control signaling includes a first-type parameter corresponding to a measurement reference signal, and the first-type parameter includes a PCI or the first-type parameter includes a PCI and a second-type parameter.

The method for receiving a control signaling provided in this embodiment is executed by a first communication node in a wireless communication network, where the first communication node is a node that receives the control signaling of a second communication node to complete various traffics in the wireless communication network, the first communication node is, for example, a terminal, and the second communication node is, for example, a base station. In a conventional wireless communication network, a terminal reports a cell measurement result in an RRC signaling, but the RRC signaling is a higher-layer signaling so that transmission delay is high, affecting the cell handover speed. The reference signal resource adopted by the terminal for cell measurement is determined according to the serving cell identifier in the CSI configuration (CSI-ReportConfig) of channel state information (CSI) sent by the base station, and only the measurement reference signal of the serving cell may be uniquely determined in the CSI report configuration information according to the serving cell identifier. At this point, only the measurement of the serving cell may be completed according to the CSI report configuration sent by the base station, and the measurement result may be reported through the RRC signaling.

In this embodiment, the first communication node, that is, the terminal, receives the first control signaling, and the first control signaling includes the first-type parameter corresponding to the measurement reference signal so that the first communication node determines the measurement reference signal according to the first-type parameter. The measurement reference signal determined according to the first-type parameter is not only the measurement reference signal of the serving cell, but also another measurement reference signal corresponding to the first-type parameter. Then the first communication node may perform mobility measurement according to the measurement reference signal of a non-serving cell, and the mobility measurement result may be sent through a physical layer signaling to the second communication node of a network layer, that is, to the base station, thereby reducing the report delay of the mobility measurement result.

The first-type parameter includes a PCI or the first-type parameter includes a PCI and a second-type parameter. That is, the identifier of a cell where the mobility measurement is required to be performed and the relevant information of the required measurement may be determined according to the first-type parameter.

The measurement reference signal includes one of the following: a measurement reference signal in a CSI report configuration, a measurement reference signal with a measurement result included in a UCI, a measurement reference signal in a measurement reference signal resource set configured in a serving cell, or, a measurement reference signal in a beam failure candidate reference signal resource set.

In an embodiment, the measurement reference signal includes one of the following: a measurement reference signal in a measurement reference signal resource, a measurement reference signal in a measurement reference signal resource set or a measurement reference signal in a measurement reference signal resource set list.

In an embodiment, the second-type parameter includes at least one of the following: a serving cell index, a measurement object index (MeasureobjectID), a measurement link index, a measurement configuration index (MeasconfigID), an NR absolute radio-frequency channel number (ARFCN), a parameter of a frequency domain reference point (PointA) for determining a frequency domain location occupied by the measurement reference signal or a frequency domain bandwidth. In this embodiment, the frequency domain information includes one or more of a PointA and a frequency domain bandwidth.

In an embodiment, one frequency domain bandwidth includes one of the following: a serving cell index, a component carrier (CC), a bandwidth part (BWP), a physical resource block (PRB) set, a frequency band (Band), a PRB span or a carrier frequency, where the PRB span includes a section of continuous PRBs, and the measurement reference signal occupies resources in every x PRBs in the PRB span, where x is a positive integer greater than or equal to 1.

In an embodiment, the second-type parameter is used for determining at least one of the following pieces of information of the measurement reference signal: a measurement object corresponding to the measurement reference signal, a report parameter corresponding to the measurement reference signal or a measurement parameter corresponding to the measurement reference signal. That is, at least one of a measurement object, a report parameter or a measurement parameter corresponding to the measurement reference signal may be determined according to the second-type parameter.

In an embodiment, if the second-type parameter is used for determining the measurement object corresponding to the measurement reference signal, the method includes at least one of the following: the measurement reference signal belongs to a mobility measurement reference signal configured in the measurement object corresponding to the measurement reference signal; or, a third-type parameter of the measurement reference signal is determined according to the measurement object corresponding to the measurement reference signal, where the third-type parameter includes at least one of the following: an occupied PRB set, a subcarrier spacing, a PointA or a frequency domain bandwidth.

In an embodiment, if the second-type parameter is used for determining the measurement object corresponding to the measurement reference signal and the measurement reference signal includes a synchronization signal, the method further includes at least one of the following: a synchronization signal index belongs to a synchronization signal index set selected from the measurement object; the PCI included in the first-type parameter belongs to a white cell list, where the white cell list is a white cell list in the measurement object; or, the PCI included in the first-type parameter does not belong to a black cell list, where the black cell list is a black cell list in the measurement object; where the measurement object is the measurement object corresponding to the measurement reference signal.

In an embodiment, the report parameter includes one of the following: a report parameter for a trigger event, where whether the trigger event is satisfied is determined according to a measurement result obtained based on the measurement reference signal, and in a case where the trigger event is satisfied, the measurement result is reported in the UCI; or, a report parameter configured in a measurement link index, where the measurement link index is determined according to the second-type parameter.

In an embodiment, the measurement object corresponding to the measurement reference signal includes one of the following: a measurement object corresponding to a serving cell in the second-type parameter; a measurement object corresponding to a measurement object index in the second-type parameter; a measurement object included in a measurement link index corresponding to a measurement link index in the second-type parameter; or, a measurement object corresponding to both a measurement configuration index in the second-type parameter and a measurement object index in the second-type parameter. The measurement object corresponding to the serving cell includes one of the following: a measurement object corresponding to a serving cell measuring object of the serving cell, or, a measurement object with frequency domain information which and frequency domain information of the serving cell satisfy a predetermined condition.

In operation S1020, the measurement reference signal is determined according to the first-type parameter for measurement, and a measurement result is reported through a physical layer.

After the first control signaling is received, the first communication node may determine the measurement reference signal used for the measurement. Then the first communication node may perform inter-cell mobility measurement according to the determined measurement reference signal and report the measurement result through the physical layer, thereby reducing the report delay of the mobility measurement result and improving the cell handover speed.

In an embodiment, the following is described by using an example where the first control signaling is CSI-ReportConfig. A measurement reference signal resource in CSI-ReportConfig is determined according to the first-type parameter, that is, the PCI and the frequency domain information are a PCI and frequency domain information corresponding to the measurement reference signal in CSI-ReportConfig. Each (PCI, second-type parameter) combination corresponds to one measurement reference signal resource set list. Alternatively, a mobility measurement reference signal resource in CSI-ReportConfig is determined through the first-type parameter, and a measurement reference signal of a non-mobility measurement reference signal resource in CSI-ReportConfig is not determined through the first-type parameter but is determined according to third information. At this point, (PCI, second-type parameter) is configured for the mobility measurement reference signal in CSI-ReportConfig, and the third information is configured for the non-mobility measurement reference signal in CSI-ReportConfig. For example, the third information is a serving cell index and indicates that the non-mobility measurement reference signal belongs to the measurement reference signal configured in the serving cell. The mobility measurement reference signal is included in one or more measurement objects (MeasObjects). When the mobility measurement reference signal includes an SSB, the PCI corresponding to the SSB is included in a white cell list configured in a MeasObject, or the PCI corresponding to the SSB is not included in a black cell list configured in a MeasObject. The MeasObject to which the mobility measurement reference signal belongs includes one of the following: a MeasObject corresponding to a serving cell measurement (serving-CellMO) configured in a serving cell, where the serving cell index is included in the second-type parameter; a MeasObject corresponding to a measurement object index (MeasureObjectID) in the second-type parameter; a MeasObject included in a MeasID in the second-type parameter; or, a MeasObject where the synchronization signal frequency domain information (ssbFrequency) is equal to the ARFCN/PointA/frequency domain information in the second-type parameter (or the difference between the ssbFrequency and the second-type parameter is less than a predetermined value).

When the second-type parameter is the MeasureobjectID, if the measurement reference signal resource is an SSB, the SSB frequency domain information is determined according to an ssbFrequency configured in an NR measurement object index (MeasureobjectNR) corresponding to the MeasureobjectID. The time domain resource index corresponding to the SSB (also known as the SSB index) belongs to an SSB index selected by an SSB measurement configuration (ssb-ToMeasure) configured in the MeasureobjectNR. If the measurement reference signal resource is a CSI-RS, the PointA corresponding to the CSI-RS resource may be acquired according to a CSI-RS reference frequency (refFreqCSI-RS) configured in the MeasureobjectNR corresponding to the MeasureobjectID, and a subcarrier spacing and the band information corresponding to the CSI-RS resource may also be acquired through a subcarrier spacing configured in the CSI-RS mobility resource configuration (CSI-RS-ResourceConfigMobility) in the MeasureobjectNR corresponding to the MeasureobjectID. Alternatively, the measurement reference signal at this point includes a measurement reference signal corresponding to a PCI configured in the MeasObject, including an SSB or a CSI-RS for mobility measurement. In this embodiment, the case where the measurement reference signal is not the mobility measurement reference signal is not excluded. Only the third-type parameter of the measurement reference signal resource is acquired through the information configured in the MeasureobjectNR corresponding to the MeasureobjectID, where the third-type parameter includes at least one of the following pieces of information: an occupied PRB span, a subcarrier spacing, a PointA or a Band, while other information of the measurement reference signal is configured outside the MeasObject, where other information of the measurement reference signal includes one or more of the following information: a time domain parameter, an occupied RE location, a PRB position, the number of ports or a quasi co-location measurement reference signal, for example, the other information of the measurement reference signal is configured in a CSI resource configuration index (CSI-ResourceConfigId) associated with the CSI-ReportConfig; where the PRB span includes a section of continuous PRBs, and the measurement reference signal occupies resources in every x PRBs in the PRB span, where x is a positive integer greater than or equal to 1.

When the second-type parameter is a MeasID, the third-type parameter of the measurement reference signal resource is acquired according to the MeasObject included in the MeasID, or the measurement reference signal resource belongs to a measurement reference signal configured in the MeasObject included in the MeasID. The measurement parameter and/or report parameter of the CSI measurement report are determined based on the parameters configured in the mobility measurement report configuration (ReportConfig) included in the MeasID.

When the second-type parameter includes the ARFCN, the PointA information of the measurement reference signal resource is acquired according to the ARFCN.

When the second-type parameter includes the MeasConfig, the CSI report configuration acquires the measurement reference signal and the report parameter based on the information configured in the MeasConfig. For example, the report parameters include a parameter of a trigger event. Whether the trigger event is satisfied based on the measurement result obtained based on the measurement reference signal is determined, and when the trigger event is satisfied, the measurement result is reported in the UCI. Alternatively, the measurement index (MeasID) is determined according to the second-type parameter, and the report parameter is acquired according to the parameters configured in the report configuration (ReportConfig) corresponding to the report configuration index (ReportConfigId) included in the MeasID.

The measurement reference signal resource in the CSI-ReportConfig includes at least one of the following: a channel measurement reference signal resource or an interference measurement reference signal resource. (PCI, second-type parameter) may be configured for the channel measurement reference signal resource and the interference measurement reference signal resource in the CSI-ReportConfig respectively so that the channel measurement signal and the interference measurement signal may correspond to different (PCI, second-type parameter), or the channel measurement reference signal and the interference measurement reference signal in the CSI-ReportConfig may also share one (PCI, second-type parameter). The channel measurement reference signal of the CSI-ReportConfig includes one or more channel measurement reference signal resource sets, and each set includes one or more measurement reference signal resources. At this point, one or more channel measurement reference signal resource sets may share one (PCI, second-type parameter), or corresponding (PCI, second-type parameter) may be configured for each channel measurement reference signal resource set, or even corresponding (PCI, second-type parameter) may be configured for each channel measurement reference signal resource in each set. Similarly, the first-type parameter may be configured for each interference measurement reference signal resource, or the first-type parameter may be configured for each interference measurement reference signal resource set, or one or more interference measurement reference signal resource sets in the CSI-ReportConfig may share one second-type parameter. Alternatively, the configuration level of the first-type parameter is different from the configuration level of the second-type parameter. For example, only one second-type parameter is configured in one CSI-ReportConfig and is shared by the interference measurement signal and the channel measurement signal. The PCI is configured for the interference measurement signal and the channel measurement signal respectively, or The PCI is configured for each interference signal resource set and/or each channel measurement signal resource set, or The PCI is configured for each interference signal measurement resource and/or each channel measurement resource.

In a word, the third-type parameter of the measurement reference signal resource is acquired through the second-type parameter, or the measurement reference signal is the mobility measurement reference signal corresponding to the first-type parameter. The measurement result obtained according to the measurement reference signal may be included in a physical uplink control channel (PUCCH) or a physical uplink shared channel (PUSCH) and reported to the base station. In this manner, the measurement result of a neighboring cell is sent to the base station earlier.

In an embodiment, when the channel state information based on the mobility measurement reference signal is reported on the PUCCH or the PUSCH through the method provided in this embodiment, the filtering process during mobility measurement is not performed on the channel state information, that is, the channel state measurement result is an instantaneous measurement result, the weighted average of multiple measurement results is not performed, and especially the non-average weighted average of multiple measurement results is not performed.

In the method for receiving a control signaling provided in this embodiment, the first control signaling including the first-type parameter corresponding to the measurement reference signal is received, where the first-type parameter includes the PCI or the first-type parameter includes the PCI and the second-type parameter. In this manner, the measurement reference signal may be determined according to the first-type parameter for mobility measurement and the measurement result is reported through the physical layer, and since the delay of the measurement result reported through the physical layer is low, the report delay of the mobility measurement result is reduced, thereby improving the cell handover speed.

Figure 2:
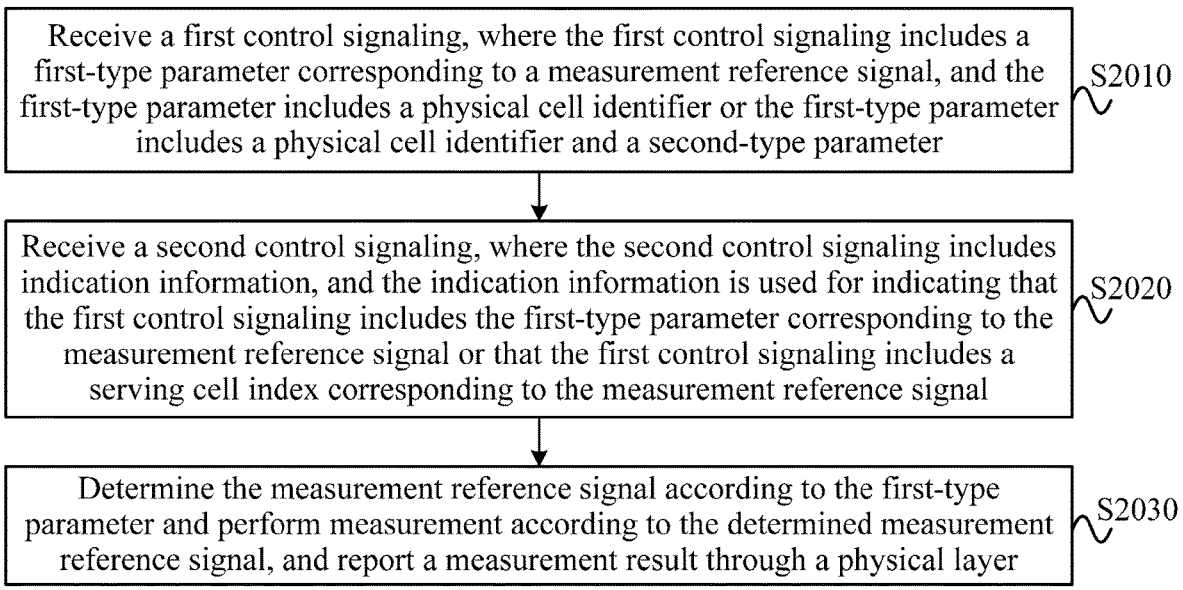
FIG. 2 is another flowchart of a method for receiving a control signaling according to an embodiment.

FIG. 2 is another flowchart of a method for receiving a control signaling according to an embodiment. As shown in FIG. 2, the method provided in this embodiment includes operations S2010, S2020 and S2030.

In operation S2010, a first control signaling is received, where the first control signaling includes a first-type parameter corresponding to a measurement reference signal, and the first-type parameter includes a PCI or the first-type parameter includes a PCI and a second-type parameter.

In operation S2020, a second control signaling is received, where the second control signaling includes indication information, and the indication information is used for indicating that the first control signaling includes the first-type parameter corresponding to the measurement reference signal or that the first control signaling includes a serving cell index corresponding to the measurement reference signal.

In this embodiment, after the first communication node receives the first control signaling, the first communication node may also receive the second control signaling, and the second control signaling is used for indicating that the first control signaling includes the first-type parameter corresponding to the measurement reference signal or that the first control signaling includes a serving cell index corresponding to the measurement reference signal. That is, the first communication node is enabled to know that the first control signaling includes the first-type parameter or that the first control signaling includes the serving cell index corresponding to the measurement reference signal. In order not to increase the number of control signalings, the first control signaling may be an existing signaling to which the first-type parameter is added, and then in order to enable the first communication node to obtain the first-type parameter from the first control signaling, the first communication node may be informed using the second control signaling.

In an embodiment, in a case where the first control signaling includes the first-type parameter, a measurement reference signal resource index in the first control signaling is an index of a mobility measurement reference signal resource; and in a case where the first control signaling includes the serving cell index, the measurement reference signal resource index in the first control signaling is an index of a measurement reference signal resource in the serving cell; where the first control signaling includes a CSI report configuration signaling.

Whether the serving cell index or the first-type parameter is selected to be configured in the CSI-ReportConfig is determined through signaling information. When the serving cell index is selected to be configured, the measurement reference signal included in the CSI-ReportConfig belongs to the measurement reference signal configured in the serving cell, and/or the PointA information of the measurement reference signal resource is determined according to the PointA information configured in the serving cell, and/or the frequency domain resource where the measurement reference signal is located is in the BWP activated by the serving cell. When the first-type parameter is selected to be configured, the measurement reference signal in the CSI-ReportConfig includes a mobility measurement reference signal, and the mobility measurement reference signal is determined according to the first-type parameter.

In operation S2030, the measurement reference signal is determined according to the first-type parameter for measurement, and a measurement result is reported through a physical layer.

In an embodiment, the measurement reference signal resource set includes at least one of: a measurement reference signal resource set configured in the serving cell; or, a measurement reference signal resource set where the mobility measurement reference signal resource locates.

In an embodiment, one measurement reference signal resource set includes measurement reference signals corresponding to different first-type parameters. A measurement reference signal resource is selected from the measurement reference signal resource set, and an index of the selected measurement reference signal resource is included in a UCI or in a media access control-control element (MAC-CE) for reporting. The measurement reference signal resource is selected from the measurement reference signal resource set according to one of the following manners: the measurement reference signal resource is selected from the measurement reference signal resource set according to a power difference between measurement reference signals corresponding to different first-type parameters; the measurement reference signal resource is selected from the measurement reference signal resource set according to priorities of first-type parameters; in a case where transmitting powers of synchronization signals corresponding to all first-type parameters in the measurement reference signal resource set are the same, the measurement reference signal resource is selected from the measurement reference signal resource set; transmitting powers of the measurement reference signal resource is ignored, and the measurement reference signal resource is selected from the measurement reference signal resource set; or, a transmitting power of a measurement reference signal resource corresponding to each first-type parameter is acquired, and the measurement reference signal resource is selected from the measurement reference signal resource set according to a transmitting power of the measurement reference signal resource and receiving performance of the measurement reference signal at a receiving end.

In an embodiment, an uplink control signaling further includes at least one of the following pieces of information: a measurement configuration index, a measurement link index, a measurement object index, a serving cell measurement result list, a neighboring cell measurement result list or a fifth-type parameter measurement result list. The serving cell measurement result list includes one or more serving cell measurement results, and one serving cell measurement result includes at least one of the following pieces of information: a serving cell index, cell measurement information corresponding to a serving cell or cell measurement information corresponding to the best neighboring cell. The neighboring cell measurement result list includes one or more neighboring cell measurement results, and one neighboring cell measurement result includes at least one of the following pieces of information: a PCI or cell measurement information corresponding to a neighboring cell. The fifth-type parameter measurement result list includes one or more fifth-type parameter measurement results, and one fifth-type parameter measurement result includes at least one of the following pieces of information: a fifth-type parameter or cell measurement information corresponding to the fifth-type parameter, where the fifth-type parameter includes one of the following: a PCI, a PCI and a measurement object index, or a PCI and a measurement link index. The uplink control signaling includes one of the following: a UCI or an uplink MAC-CE command.

In an embodiment, the first control signaling further includes at least one of the following pieces of information: a measurement configuration index, a measurement link index, a measurement object index, a serving cell measurement result list, a neighboring cell measurement result list or a fifth-type parameter measurement result list. The serving cell measurement result list includes one or more serving cell measurement results, and one serving cell measurement result includes at least one of the following pieces of information: a serving cell index, cell measurement information corresponding to a serving cell or cell measurement information corresponding to the best neighboring cell. The neighboring cell measurement result list includes one or more neighboring cell measurement results, and one neighboring cell measurement result includes at least one of the following pieces of information: a PCI or cell measurement information corresponding to a neighboring cell. The fifth-type parameter measurement result list includes one or more fifth-type parameter measurement results, and one fifth-type parameter measurement result includes at least one of the following pieces of information: a fifth-type parameter or cell measurement information corresponding to the fifth-type parameter, where the fifth-type parameter includes one of the following: a PCI, a PCI and a measurement object index, or a PCI and a measurement link index. The first control signaling includes one of the following: a UCI or an uplink MAC-CE command.

In an embodiment, when one serving cell corresponds to multiple PCIs, the cell measurement information of the serving cell is determined according to one of the following manners: the cell measurement information of the serving cell is obtained according to a mobility measurement reference signal corresponding to one of the multiple PCIs; a cell measurement result corresponding to each of the multiple PCIs is included in the cell measurement information of the serving cell; or, the cell measurement information of the serving cell is obtained according to cell measurement information corresponding to one of the multiple PCIs.

In an embodiment, the cell measurement information includes at least one of the following pieces of information: reference signal received power (RSRP)/reference signal receiving quality (RSRQ)/a signal-to-interference-plus-noise ratio (SINR) corresponding to a cell, a measurement reference signal resource index list, an RSRP/RSRQ/SINR corresponding to a measurement reference signal resource in a measurement reference signal resource list, where the RSRP/RSRQ/SINR corresponding to the cell are obtained based on one or more measurement reference signal resources in the cell, and a measurement reference signal resource in the measurement reference signal resource index list belongs to a measurement reference signal resource set corresponding to the cell.

In an embodiment, whether a trigger event is satisfied may be determined according to the cell measurement information of the serving cell, and in a case where the trigger event is satisfied, a mobility measurement result is sent, where the mobility measurement result includes one of the following: a UCI, an uplink MAC-CE signaling or uplink higher-layer information.

In an embodiment, in a case where the measurement reference signal includes the measurement reference signal in the beam failure candidate reference signal resource set, the first control signaling includes a first-type parameter corresponding to a measurement reference signal resource in the beam failure candidate reference signal resource set, and the method further includes at least one of the following: from a predetermined time instant, a demodulation reference signal of a predetermined downlink channel and a mobility measurement reference signal corresponding to a new measurement reference signal resource satisfy a quasi co-location relationship; or, a starting time instant when a demodulation reference signal of a predetermined downlink channel and a new measurement reference signal resource satisfy the quasi co-location relationship is determined according to a type of the new measurement reference signal resource, where the new measurement reference signal is a measurement reference signal resource selected by the first communication node from the beam failure candidate reference signal resource set, the type of the new measurement reference signal resource includes a mobility measurement reference signal resource and a measurement reference signal resource in the serving cell, and the first communication node is a communication node receiving the first control signaling. If the beam failure candidate reference signal set belongs to a primary cell, the predetermined downlink channel includes at least one of the following: a downlink control channel in a control resource set (CORESET) associated with a beam failure search space or a physical downlink shared channel (PDSCH) scheduled in the downlink control channel in the CORESET associated with the beam failure search space. If the beam failure candidate reference signal set belongs to a secondary cell, the predetermined downlink channel includes at least one of the following: a downlink control channel in all CORESETs in the secondary cell or a PDSCH in the secondary cell.

In an embodiment, determining the starting time instant when the demodulation reference signal of the predetermined downlink channel and the new measurement reference signal resource satisfy the quasi co-location relationship according to the type of the new measurement reference signal resource includes: in a case where the type of the new measurement reference signal resource is the measurement reference signal resource in the serving cell, a time interval between the starting time instant and a first time instant is a first time duration; and in a case where the type of the new measurement reference signal resource is the mobility measurement reference signal resource, the time interval between the starting time instant and the first time instant is a second time duration; where the first time duration is shorter than the second time duration.

In an embodiment, the method further includes: at least one of the following is determined according to a third control signaling or a predetermined rule: a measurement reference signal resource set to which a mobility measurement reference signal resource belongs; a measurement reference signal resource set list to which the mobility measurement reference signal resource belongs; a measurement reference signal resource set where the mobility measurement reference signal resource locates; or, a measurement reference signal resource set list including the mobility measurement reference signal resource; where a mobility measurement reference signal belongs to a measurement reference signal configured in a measurement object. When the measurement reference signal is the mobility measurement reference signal, a resource set or a resource list to which the mobility measurement reference signal belongs may also be determined.

In an embodiment, the method further includes one of the following: the measurement reference signal resource set to which the mobility measurement reference signal resource belongs is included in a configuration signaling of the mobility measurement reference signal resource; a measurement reference signal resource set to which the mobility measurement reference signal belongs is determined according to the first-type parameter, where the first-type parameter includes a first-type parameter corresponding to the mobility measurement reference signal; the measurement reference signal resource set where the mobility measurement reference signal resource locates is configured in a measurement configuration; or, the measurement reference signal resource set where the mobility measurement reference signal resource locates is configured in the measurement object.

In an embodiment, the method further includes one of the following: the measurement reference signal resource set list to which the mobility measurement reference signal resource belongs is included in a configuration signaling of the mobility measurement reference signal resource; a measurement reference signal resource set list of the mobility measurement reference signal is determined according to the first-type parameter; the measurement reference signal resource set list of the mobility measurement reference signal resource is configured in a measurement configuration; or, the measurement reference signal resource set list of the mobility measurement reference signal resource is configured in the measurement object.

In an embodiment, the first control signaling includes at least one of the following: a CSI report configuration signaling; a configuration signaling of a measurement reference signal resource set list; a configuration signaling of a measurement reference signal resource set; or, a configuration signaling of a measurement reference signal resource; where one measurement reference signal resource set list includes one or more measurement reference signal resource sets, and one measurement reference signal resource set includes one or more measurement reference signal resources.

In an embodiment, in a case where the first control signaling includes the CSI report configuration signaling, a channel measurement reference signal and an interference measurement reference signal in the CSI report configuration signaling share one first-type parameter; the channel measurement reference signal and the interference measurement reference signal in the CSI report configuration signaling separately correspond to one respective first-type parameter; the channel measurement reference signal and the interference measurement reference signal in the CSI report configuration signaling share the second-type parameter, and a channel measurement reference signal resource set list and an interference measurement reference signal resource set list separately correspond to one respective PCI parameter; the channel measurement reference signal and the interference measurement reference signal in the CSI report configuration signaling share the second-type parameter, and a channel measurement reference signal resource set and an interference measurement reference signal resource set separately correspond to one respective PCI parameter; or, the channel measurement reference signal and the interference measurement reference signal in the CSI report configuration signaling share the second-type parameter, and a channel measurement reference signal resource and an interference measurement reference signal resource separately correspond to one respective PCI parameter, where the first-type parameter includes the PCI and the second-type parameter.

In an embodiment, the method includes one of the following: the first-type parameter is included in the configuration signaling of the measurement reference signal resource set list, where measurement reference signal resources in the measurement reference signal resource set list share the first-type parameter; the first-type parameter is included in the configuration signaling of the measurement reference signal resource set, where measurement reference signal resources in the measurement reference signal resource set share the first-type parameter; the first-type parameter is included in the configuration signaling of the measurement reference signal resource; the second-type parameter is included in the configuration signaling of the measurement reference signal resource set list, where measurement reference signal resources in the measurement reference signal resource set list share the second-type parameter, and each measurement reference signal resource set in the measurement reference signal resource set list corresponds to one PCI; the second-type parameter is included in the configuration signaling of the measurement reference signal resource set list, where measurement reference signal resources in the measurement reference signal resource set list share the second-type parameter, and each measurement reference signal resource in the measurement reference signal resource set list corresponds to one PCI; or, the second-type parameter is included in the configuration signaling of the measurement reference signal resource set, where measurement reference signal resources in the measurement reference signal resource set share the second-type parameter, and each measurement reference signal resource in the measurement reference signal resource set corresponds to one PCI.

In an embodiment, the method includes one of the following: the second-type parameter is included in a configuration signaling of a measurement reference signal resource set list, where measurement reference signal resources in the measurement reference signal resource set list share the second-type parameter, and each measurement reference signal resource set in the measurement reference signal resource set list corresponds to one PCI; the second-type parameter is included in a configuration signaling of a measurement reference signal resource set list, where measurement reference signal resources in the measurement reference signal resource set list share the second-type parameter, and each measurement reference signal resource in the measurement reference signal resource set list corresponds to one PCI; or, the second-type parameter is included in a configuration signaling of a measurement reference signal resource set, where measurement reference signal resources in the measurement reference signal resource set share the second-type parameter, and each measurement reference signal resource in the measurement reference signal resource set corresponds to one PCI; where the first-type parameter includes the PCI and the second-type parameter.

In an embodiment, index information of a measurement reference signal resource in a measurement reference signal resource set is included in the UCI. That is, the selection information of the measurement reference signal in the measurement reference signal resource set is included in the UCI.

In an embodiment, the method further includes: in a case where the measurement result of the measurement reference signal is included in an uplink control signaling, whether a measurement duration of the measurement reference signal is limited is determined according to whether the first-type parameter corresponding to the measurement reference signal belongs to a predetermined first-type parameter set, where the uplink control signaling includes one of the following: a UCI or an uplink MAC-CE.

In an embodiment, the method further includes at least one of the following: in a case where the first-type parameter belongs to the predetermined first-type parameter set, the measurement timing of the measurement reference signal is determined not to be limited; or, in a case where the first-type parameter does not belong to the predetermined first-type parameter set, the measurement timing of the measurement reference signal is determined to be limited; where each first-type parameter in the predetermined first-type parameter set is associated with one serving cell, the measurement timing is limited in one of the following manners: the measurement timing of the measurement reference signal falls in a measurement gap (MeasGap) or a synchronization signal in the measurement reference signal falls in a synchronization signal/physical broadcast channel block measurement timing configuration (SMTC) timing window.

In combination with various cases in the embodiments described above, the method for receiving a control signaling provided in this embodiment may enable the measurement reference signal resource of the CSI-ReportConfig to include the mobility measurement reference signal in one of the following manners one to three.

In manner one, the measurement reference signal resource in the CSI-ReportConfig is selected from a serving cell measurement reference signal set list (CSI-ResourceConfigId) and a mobility measurement reference signal set list. The reference signals included in the serving cell measurement reference signal resource list measurement reference signal set list belong to the reference signals configured in the serving cell, and the mobility measurement reference signal set list includes mobility measurement reference signals. One mobility measurement reference signal set list includes one or more mobility measurement reference signal sets, and the mobility measurement reference signal set includes one or more mobility measurement reference signals. In this manner, whether the measurement reference signal resource in the CSI-ReportConfig is a serving cell measurement reference signal set list (CSI-ResourceConfigId) or a mobility measurement reference signal set list is determined according to whether PCI information is configured. When the first-type parameter is configured in the CSI-ReportConfig, the measurement reference signal resource in the CSI-ReportConfig belongs to the mobility measurement reference signal set list, and when only a serving cell index is configured in the CSI-ReportConfig, the measurement reference signal in the CSI-ReportConfig belongs to the serving cell measurement reference signal set list.

In manner two, the measurement reference signal of the CSI-ReportConfig includes a mobility measurement reference signal having a predetermined index CSI-RS index (CSI-RS-Index), and the CSI-RS-Index is acquired according to a non-zero power (NZP) CSI-RS resource index (NZP-CSI-RS-ResourceId), that is, the index of the NZP-CSI-RS-ResourceId is the same as the index of the mobility measurement reference signal, where the NZP-CSI-RS-ResourceId is obtained according to a resource index configured in the CSI-ResourceConfigId configured in the CSI-ReportConfig. When no PCI is configured in the CSI-ReportConfig, the measurement reference signal index configured in the CSI-ReportConfig is a serving cell measurement reference signal index, and when a PCI is configured in the CSI-ReportConfig, the measurement reference signal index configured in the CSI-ReportConfig is a measurement reference signal index (that is, mobility measurement reference signal index) configured in the Measobject.

Alternatively, when the PCI configured in the CSI-ReportConfig belongs to a predetermined PCI set, the measurement reference signal index configured in the CSI-ReportConfig is the serving cell measurement reference signal index, and when the PCI configured in the CSI-ReportConfig does not belong to the predetermined PCI set, the measurement reference signal index configured in the CSI-ReportConfig is the mobility measurement reference signal index. The predetermined PCI set includes one of the following: a set of PCIs configured for the serving cell through an RRC; a set of PCIs activated for the serving cell; PCIs included in transmission configuration indicator (TCI) state information configured in the RRC signaling; PCIs included in TCI state information activated in a MAC-CE; PCIs included in TCI state information configured for one frequency domain bandwidth in the RRC signaling; or, PCIs included in TCI state information activated for one frequency domain bandwidth in the MAC-CE. That is, whether the measurement reference signal index included in the measurement reference set corresponds to the index of a serving cell measurement reference signal resource or the index of a mobility measurement reference signal resource is determined according to whether the first-type parameter corresponding to the measurement reference signal or the serving cell index corresponding to the measurement reference signal is configured in the CSI-ReportConfig.

In manner three, the reference signal in one measurement reference signal set list may be a serving cell reference signal or a mobility measurement reference signal, and the measurement reference signal set list where the serving cell reference signal is located and the mobility measurement reference signal set list are uniformly labeled.

When the CSI report measurement reference signal includes the mobility measurement reference signal, the index of the measurement reference signal set to which the mobility measurement reference signal belongs and/or an index of a measurement reference signal set list need to be determined, where one measurement reference signal set list includes one or more measurement reference signal sets, and one measurement reference signal set includes one or more measurement reference signal resources. The measurement reference signal set to which the mobility measurement reference signal and/or the measurement reference signal set list are determined in one of the following manners one to six.

In manner one, when a measurement reference signal resource (that is, mobility measurement reference signal resource) is configured in the MeasObject, measurement reference signal set identifier information is configured, and when a CSI-RS-Resource-Mobility resource (as shown in Table 5) is configured in the MeasObject, a measurement reference signal set list index (CSI-ResourceConfigId) or a measurement reference signal set index is configured for this resource so that different mobility measurement reference signal resources corresponding to one PCI in one MeasObject belong to different measurement reference signal sets.

In manner two, one PCI configuration measurement reference signal resource in the MeasObject corresponds to one measurement reference signal set index or one measurement reference signal set list index. When a CSI-RS-CellMobility resource list is configured for one PCI in the MeasObject (as shown in Table 4), the corresponding measurement reference signal set index and/or measurement reference signal set list index are configured. The measurement reference signals in the CSI-RS-ResourceList-Mobility corresponding to the cellId (that is, PCI, Physical Cell Index) in Table 4 in the MeasObject belong to the same measurement reference signal set and/or the same measurement reference signal set list.

In manner one and manner two, it is specified that one MeasObject or one MeasConfig includes mobility measurement reference signals associated with a same measurement reference signal set index belong to a same measurement reference signal set, so that one measurement reference signal set is allowed to include mobility measurement reference signals corresponding to different PCIs.

In manner three, all mobility measurement reference signals corresponding to (PCI, MeasObject) are used as measurement reference signal resources of the CSI-ReportConfig, for example, these mobility measurement reference signals are all used as channel measurement reference signal resources of the CSI-ReportConfig. No set index or set list index is configured in Table 4, and the first-type parameter is equivalent to the set index, that is, only the first-type parameters corresponding to the mobility measurement reference signals need to be determined when the mobility measurement reference signal set is determined.

In manner four, the measurement reference signal set list information is configured in the Measobject, one Measobject may include one or more measurement reference signal set lists (CSI-ResourceConfig), one measurement reference signal set list includes one or more measurement reference signal sets, and one measurement reference signal set includes mobility measurement reference signals configured in the Measobject, where the mobility measurement reference signal includes one or more of a CSI-RS or an SSB. The measurement reference signals included in one measurement reference signal set satisfy one of the following conditions: the PCIs corresponding to the measurement reference signals included in one set is the same; or, the PCIs corresponding to the measurement reference signals included in one set may be different, that is, the measurement reference signals included in one set include mobility measurement reference signals corresponding to multiple PCIs, and at this point, the measurement reference signals included in one measurement reference signal set are represented by (PCI, measurement reference signal index).

In manner five, a measurement reference signal set list is configured in the MeasConfig. One MeasConfig may include one or more measurement reference signal sets. The measurement reference signals included in one measurement reference signal set satisfy one of the following conditions: the PCIs corresponding to the measurement reference signals included in one set is the same; the number of PCIs corresponding to the measurement reference signals included in one set may be greater than 1; the measurement reference signals included in one set correspond to one MeasObjectID; or, the measurement reference signals included in one set include one or more reference signals in MeasObjectID, and at this point, the measurement reference signals included in one measurement reference signal set are represented by (MeasObjectID, PCI, measurement reference signal index).

In manner four and manner five, the measurement reference signal set list configuration information includes at least one of the following: a measurement reference signal set list index, measurement reference signal resource sets included in a measurement reference signal set list or mobility measurement reference signals included in a measurement reference signal set.

In manner six, in the measurement reference signal set lists (CSI-ResourceConfig) included in the CSI-MeasConfig of the serving cell, the corresponding PCI information is configured for a CSI-RS/SSB resource or a PCI and a second-type parameter are configured for the CSI-RS/SSB resource. The PCI information may be configured for the CSI-RS in one of the following manners A and B.

In manner A, the PCI information is configured in a non-zero power CSI-RS measurement reference signal (NZP-CSI-RS) resource, that is, the corresponding PCI (or PCI and a second-type parameter) is configured for each CSI-RS resource. One set may include NZP-CSI-RSs corresponding to multiple PCIs.

In manner B, the PCI is configured in a non-zero power CSI-RS measurement reference signal resource set (NZP-CSI-RS-ResourceSet), that is, all measurement reference signals in one set correspond to one PCI (or one PCI and second-type parameter). The PCI is configured in the CSI-ResourceConfig, that is, all CSI-RSs in all sets in one CSI-ResourceConfig correspond to one PCI (or one PCI and second-type parameter), where one CSI-ResourceConfig includes one or more sets.

The PCI information may be configured for the SSB in one of the following manners 1) to 3).

In manner 1), the corresponding PCI (or one PCI and second-type parameter) is configured for each SSBIndex, and one set may include SSBs corresponding to multiple PCIs.

In manner 2), the corresponding PCI (or one PCI and second-type parameter) is configured for each CSI-SSB-ResourceSet, and all SSBs in one set correspond to one PCI (or one PCI and second-type parameter).

In manner 3), the PCI (or one PCI and second-type parameter) is configured in the CSI-ResourceConfig, that is, all SSBs in all sets in the CSI-ResourceConfig correspond to one PCI (or one PCI and second-type parameter), where one CSI-ResourceConfig includes one or more sets.

In an embodiment of the present application, when the channel state information obtained based on the SSB is used as the channel state information of the physical layer (L1 layer) to report to the base station, whether the measurement timing of the SSB is limited by the SMTC is determined according to the PCI corresponding to the SSB. For example, when the PCI corresponding to the SSB belongs to a predetermined PCI set, the measurement timing of the SSB is not limited by the SMTC, and when the PCI corresponding to the SSB does not belong to the predetermined PCI set, the measurement timing of the SSB is limited by the SMTC, where the predetermined PCI set includes one of the following: a set of PCIs configured for the serving cell through an RRC; a set of PCIs activated for the serving cell; PCIs included in TCI state information configured in the RRC signaling; PCIs included in TCI state information activated in a MAC-CE; PCIs included in TCI state information configured for one frequency domain bandwidth in the RRC signaling; or, PCIs included in TCI state information activated for one frequency domain bandwidth in the MAC-CE. The measurement timing of the SSB is limited by the SMTC in the following manner: the SSB may only be measured in an SMTC window. In this embodiment of the present application, one frequency domain bandwidth includes one of the following: a serving cell, a CC, a BWP or a PRB set. The channel state information obtained based on the SSB includes at least one of the following: an RSRP, a SINR or an RSRQ.

In an embodiment of the present application, when one measurement reference signal set includes SSBs corresponding to multiple first-type parameters, index information of the SSBs is calculated according to the SSBs corresponding to the multiple first-type parameters, for example, the SSB resource indicator (SSBRI) reported by the terminal indicates the location of a (SSBIndex, first-type parameter) combination in one SSB set. The maximum number of SSBs included in one SSB set is greater than the maximum number of SSBs corresponding to one first-type parameter. For example, the maximum number of SSBs included in one SSB set is greater than 64, and when the SSBRI is fed back, the maximum number of feedback bits may be greater than 6. The first-type parameter includes one of the following: a PCI or the combination information of a PCI and a second-type parameter.

In an embodiment of the present application, when one first-type parameter includes SSBs corresponding to more than one PCI, when an SSBRI is selected to be reported to the base station, the SSBRI to be reported is selected in one of the following manners A) to C).

In manner A), it is assumed that the transmitting power (SS-PBCH-BlockPower) of the first-type parameters corresponding to all PCIs is the same. In manner B), the influence of the SS-PBCH-BlockPower is not considered, for example, the SSBRI is reported only according to the RSRP/RSRQ/SINR corresponding to the SSB. In an embodiment, the SSBRI with RSRP/RSRQ/SINR which is the best is selected to be reported. In manner C), the SS-PBCH-BlockPower corresponding to each first-type parameter is acquired, and the SSBRI is reported according to SS-PBCH-BlockPower and the RSRP/RSRQ/SINR corresponding to the SSB.

In an embodiment, the SSBRI with the largest difference between the SS-PBCH-BlockPower and the RSRP/RSRQ/SINR is selected to be reported.

In an embodiment, if the mobility measurement reference signal result is included in the UCI information to be reported, a PUCCH resource or a PUSCH resource where the UCI information is located is configured. For example, a PUCCH resource index where the mobility measurement result corresponding to a MeasID or a PUSCH resource is located is configured in the MeasID (or MeasConfig), for example, a PUCCH resource index, a time domain characteristic of the PUCCH resource or an index of a serving cell where the PUCCH resource is located is configured, where the time domain characteristic includes at least one of the following: being periodic, being aperiodic or being semi-persistent.

In an embodiment, the UCI includes at least one of the following pieces of information: a MeasID, a MeasObjectID, a serving cell measurement result list or a neighboring cell measurement result list. The serving cell measurement result list includes one or more serving cell measurement results, and one serving cell measurement result includes at least one of the following pieces of information: a serving cell index, serving cell measurement information or best neighboring cell measurement information. The neighboring cell measurement result list includes one or more neighboring cell measurement results, and one neighboring cell measurement result includes at least one of the following pieces of information: a PCI or cell measurement information. One or more of the serving cell measurement information, the neighboring cell measurement information or the cell PCI measurement information includes at least one of the following pieces of information: an RSRP/RSRQ/SINR corresponding to the PCI, a measurement reference signal resource index list or an RSRP/RSRQ/SINR corresponding to a measurement reference signal resource in the measurement reference signal resource list. The RSRP/RSRQ/SINR corresponding to the cell is obtained based on one measurement reference signal resource in the cell or obtained by averaging the measurement results of multiple measurement reference signal resources in the cell, where the measurement reference signal resources in the measurement reference signal resource index list belong to the measurement reference signal set corresponding to the PCI. Alternatively, the UCI includes at least one of the following pieces of information: a MeasID, a MeasObjectID, a PCI list or a measurement result corresponding to each PCI, where the measurement result corresponding to one PCI includes at least one of the following: an RSRP/RSRQ/SINR corresponding to the PCI, a measurement reference signal resource index list or an RSRP/RSRQ/SINR corresponding to a measurement reference signal resource in the measurement reference signal resource list. The RSRP/RSRQ/SINR corresponding to the cell is obtained based on one measurement reference signal resource in the cell or obtained by averaging the measurement results of multiple measurement reference signal resources in the cell, where the measurement reference signal resources in the measurement reference signal resource index list belong to the measurement reference signal set corresponding to the PCI. The UCI is included in a PUCCH or a PUSCH to be reported.

In an embodiment, the terminal reports the mobility measurement results through a MAC-CE signaling. The MAC-CE includes an L1-RSRP/L1-SINR/L1-RSRQ result obtained based on a mobility measurement reference signal, where the L1-RSRP/L1-SINR/L1-RSRQ are not filtered on the RRC layer. The L1-RSRP, L1-SINR and L1-RSRQ represent the RSRP, SINR and RSRQ of the physical layer, respectively. Alternatively, the MAC-CE includes an RSRP/SINR/RSRQ result obtained based on a mobility measurement reference signal, where the RSRP/SINR/RSRQ is filtered on the RRC layer. That is, the mobility measurement results stored in the terminal are reported through the MAC-CE signaling. Alternatively, the MAC-CE includes at least one of the following pieces of information: a MeasID, a serving cell measurement result list or a neighboring cell measurement result list. The serving cell measurement result list includes one or more serving cell measurement results, and one serving cell measurement result includes at least one of the following pieces of information: a serving cell index, serving cell measurement information or best neighboring cell measurement information. The neighboring cell measurement result list includes one or more neighboring cell measurement results, and one neighboring cell measurement result includes at least one of the following pieces of information: a PCI or cell measurement information. One or more of the serving cell measurement information, the neighboring cell measurement information or the cell PCI measurement information includes at least one of the following pieces of information: an RSRP/RSRQ/SINR corresponding to the PCI, a measurement reference signal resource index list or an RSRP/RSRQ/SINR corresponding to a measurement reference signal resource in the measurement reference signal resource list. The RSRP/RSRQ/SINR corresponding to the cell is obtained based on one measurement reference signal resource in the cell or obtained by averaging the measurement results of multiple measurement reference signal resources in the cell, where the measurement reference signal resources in the measurement reference signal resource index list belong to the measurement reference signal set corresponding to the PCI. Alternatively, the MAC-CE includes at least one of the following pieces of information: a MeasID, a PCI list or a measurement result corresponding to each PCI, where the measurement result corresponding to one PCI includes at least one of the following: an RSRP/RSRQ/SINR corresponding to the PCI, a measurement reference signal resource index list or an RSRP/RSRQ/SINR corresponding to a measurement reference signal resource in the measurement reference signal resource list. The RSRP/RSRQ/SINR corresponding to the cell is obtained based on one measurement reference signal resource in the cell or obtained by averaging the measurement results of multiple measurement reference signal resources in the cell, where the measurement reference signal resources in the measurement reference signal resource index list belong to the measurement reference signal set corresponding to the PCI.

In an embodiment, when one serving cell corresponds to multiple first-type parameters, the first-type parameter corresponding to the mobility measurement reference signal on which the mobility measurement result of one serving cell is obtained needs to be determined. For example, in the mobility measurement, the mobility measurement results of a serving cell need to be reported, or whether an event is satisfied needs to be determined to determine whether to report the mobility measurement results. If the mobility measurement results need to be reported, the mobility measurement results of the serving cell need to be reported, and each of the multiple first-type parameters corresponds to one measurement reference signal set. For example, each of the multiple first-type parameters corresponds to the CSI-RSs corresponding to the PCIs configured in Table 4, respectively, and the measurement reference signal corresponding to each PCI includes the CSI-RS configured in Table 4 or the SSB configured in Table 2. The first-type parameter includes one of the following: a PCI or a PCI and a second-type parameter. The following is described by using an example where the first-type parameter includes the PCI. The method described below is also suitable for the case where the first-type parameter includes the PCI and the second-type parameter.

When the measurement results of the serving cell need to be reported in the mobility measurement results (MeasResults), the measurement results are reported in one of the following manners one to three.

In manner one, the mobility measurement result corresponding to each of multiple PCIs of the serving cell is reported. The serving measurement result of the MeasResults (MeasResultServMO) includes multiple serving cell measurement results (measResultServingCell), where different measResultServingCells correspond to different PCIs, and the report information of each measResultServingCell includes the PCI.

In manner two, one PCI is selected from multiple PCIs corresponding to the serving cell, and the mobility measurement result corresponding to the selected PCI is reported; where one PCI is selected from multiple PCIs in one of the following manners: one PCI is selected by the terminal or the PCI with the best performance is selected.

In manner three, the mobility measurement result corresponding to a primary PCI of the serving cell is reported, where the primary PCI of the serving cell is acquired in one of the following manners: the primary PCI is a PCI configured in a serving cell common configuration (ServingCellConfigCommon); the primary PCI is a PCI configured in a serving cell common configuration system information block (SIB) (ServingCellConfigCommonSlB); the primary PCI is a PCI selected by a physical random access channel (PRACH); the primary PCI is a PCI corresponding to the first TCI state in the activated TCI states, where the activated TCI states include TCI states activated for a PDSCH in a BWP; the primary PCI is a PCI corresponding to a first CORESET group, where, for example, the first CORESET group includes a CORESET group with the lowest CORESET group index; or, the primary PCI is a minimum PCI.

The measurement result corresponding to one PCI includes at least one of the following: an RSRP/RSRQ/SINR corresponding to the PCI, a measurement reference signal resource index list or an RSRP/RSRQ/SINR corresponding to a measurement reference signal resource in the measurement reference signal resource list. The RSRP/RSRQ/SINR corresponding to the cell is obtained based on one measurement reference signal resource in the cell or obtained by averaging the measurement results of multiple measurement reference signal resources in the cell, where the measurement reference signal resources in the measurement reference signal resource index list belong to the measurement reference signal set corresponding to the PCI, for example, the measurement reference signal resources belong to the CSI-RS corresponding to the PCI in Table 4, and the measurement reference signal set corresponding to the PCI may also include the SSB configured in Table 2.

The event-based mobility measurement includes the following events: {EventA1, EventA2, EventA3, EventA4, EventA5, EventA6}, all of these events include the performance of a serving cell, where the serving cell includes one or more of a primary cell and a secondary cell. When one serving cell corresponds to multiple PCIs, the performance of the serving cell may be determined in one or more of the following manners one to four.

In manner one, the performance of the serving cell is obtained based on the mobility reference signals corresponding to multiple PCIs of the serving cell, for example, the measurement result of the serving cell is obtained by averaging the measurement results of at most N mobility measurement reference signals in the mobility measurement reference signal set composed of the mobility measurement reference signals corresponding to multiple PCIs.

In manner two, one PCI is selected from multiple PCIs corresponding to the serving cell, and the performance of the serving cell is the performance corresponding to the selected PCI, for example, the performance of the PCI with the best (or the worst) performance in the multiple PCIs is taken as the performance of the serving cell, where the performance of one PCI is the performance obtained based on the mobility measurement reference signal of the PCI.

In manner three, the performance corresponding to the primary PCI of the serving cell is taken as the performance of the serving cell, where the primary PCI of one serving cell is acquired in one of the following manners: the primary PCI is a PCI configured in the ServingCellConfigCommon; the primary PCI is a PCI configured in the ServingCellConfigCommonSlB; the primary PCI is a PCI selected by a PRACH; the primary PCI is a PCI corresponding to the first TCI state in the activated TCI states, where the activated TCI states include TCI states activated for a PDSCH in a BWP; or, the primary PCI is a PCI corresponding to a first CORESET group, for example, the first CORESET group includes a CORESET group with the lowest CORESET group index.

In manner four, the performance of the serving cell may be determined based on the serving cell itself.

The multiple PCIs corresponding to one serving cell include one of the following: multiple PCIs configured for one serving cell through an RRC signaling; multiple PCIs activated for one serving cell through a MAC-CE signaling; multiple PCIs included in a TCI state configured to one serving cell through the RRC signaling; multiple PCIs included in a TCI state activated for one serving cell through the MAC-CE signaling; multiple PCIs included in a TCI state configured for one BWP of one serving cell through the RRC signaling; or, multiple PCIs included in a TCI state activated for one BWP of one serving cell through the MAC-CE signaling; where the multiple PCIs included in the configured or activated TCI state are included in TCI states with the same TCI state index, or the multiple PCIs are included in TCI states with different TCI state indexes. The mobility measurement result may be included in one of the following: the RRC signaling, the MAC-CE signaling or the UCI.

In an embodiment, the beam failure candidate reference signal of the serving cell is configured to include a mobility measurement reference signal. When the serving cell is the primary cell, when the beam failure candidate reference signal of the primary cell includes a mobility measurement reference signal, the correspondence between the mobility measurement reference signal and the PRACH resource is established. The beam failure candidate reference signal of the serving cell indicates that in a case where a beam failure is detected by a serving cell-based beam failure detection reference signal, one candidate reference signal is selected from the beam failure candidate reference signal set, and the information of the selected candidate reference signal is reported to the base station. For example, different candidate reference signals represent different transmit beams, and the base station knows the beam selected by the terminal according to the candidate reference signal information reported by the terminal. When the serving cell is the primary cell, since the correspondence between the candidate reference signal and the PRACH resource is established, the terminal does not directly report the index information of the selected candidate reference signal, and the base station may know the candidate reference signal selected by the terminal according to the PRACH resource on which the terminal sends a PRACH signal.

When the serving cell is the primary cell, from a predetermined time instant after the candidate reference signal information is reported (that is, the PRACH signal is sent), the quasi co-location reference signal of a beam failure detection CORESET in the primary cell is determined as the selected candidate reference signal, and when the selected candidate reference signal is a mobility measurement reference signal, the quasi co-location reference signal of the beam failure detection CORESET in the primary cell is determined as the selected mobility measurement reference signal. The beam failure detection CORESET includes a CORESET associated with a beam failure detection search space.

When the serving cell is the secondary cell, in a case where the terminal detects that a beam failure occurs in the secondary cell, the terminal reports information in a PUCCH beam failure recovery (PUCCH-BFR). After the base station receives the PUCCH-BFR, the base station knows that a beam failure event occurs in the secondary cell, but the base station does not know the secondary cell where the beam failure event occurs. The base station allocates a PUSCH channel to the terminal, and the terminal sends the index of the secondary cell and the index information of the candidate reference signal selected for the secondary cell to the base station in the PUSCH allocated by the base station. When the terminal receives downlink control information (DCI) with a process number same as that of a hybrid automatic repeat request (HARD) of the PUSCH and with data indicating a new data transmission (hereinafter referred to as response information for new reference signal indication information), the terminal determines that the above-described PUSCH is successfully sent. From a predetermined time instant after the terminal receives the DCI, the terminal determines the quasi co-location reference signals of all CORESETs in the secondary cell as selected candidate reference signals, and when the selected candidate reference signals are mobility reference signals, the terminal determines the quasi co-location reference signals of all CORESETs in the secondary cell as selected mobility measurement reference signals.

That the beam failure candidate reference signal of the serving cell includes the mobility measurement reference signal is embodied in one of the following manners 1) to 3).

In manner 1), the beam failure candidate reference signal includes a reference signal configured in the MeasObject.

In manner 2), the candidate reference signal is configured to include not only the SSB/CSI-RS index but also the PCI information. For example, when the serving cell is a primary cell, the BFR-SSB resource (BFR-SSB-Resource) includes both the SSB index information and the PCI information. The BFR-CSI-RS resource (BFR-CSIRS-Resource) includes both the CSI-RS index information and the PCI information.

In manner 3), the candidate reference signal is configured to not only include the SSB/CSI-RS index, but also to include the PCI information, as well as the second-type parameter.

Through the method described above, the beam failure candidate reference signal of the serving cell includes the mobility measurement reference signal so that when the beam failure occurs in the serving cell, the mobility measurement reference signal of the non-serving cell may be selected. In this manner, the terminal can be switched to the non-serving cell, thereby achieving the rapid recovery of the link between the base station and the terminal, or, the terminal can be switched to the mobility measurement reference signal of the serving cell, and the beam of the mobile measurement reference signal is generally wider.

The PCI corresponding to the candidate reference signal does not belong to a predetermined PCI set, where the predetermined PCI set includes one of the following: a set of PCIs configured for the serving cell through an RRC; a set of PCIs activated for the serving cell; PCIs included in TCI state information configured through the RRC signaling; PCIs included in TCI state information activated through a MAC-CE; PCIs included in TCI state information configured for one frequency domain bandwidth in the RRC signaling; or, PCIs included in TCI state information activated for one frequency domain bandwidth in the MAC-CE. The measurement of the SSB is limited by the SMTC in the following manner: the SSB may only be measured in an SMTC window, meaning that when the mobility measurement reference signal is taken as the beam failure candidate reference signal the PCI corresponding to the mobility measurement reference signal does not belong to the PCI of the serving cell, or when the PCI corresponding to the beam failure candidate reference signal is not configured, the PCI corresponding to the beam failure candidate reference signal is acquired according to the PCI corresponding to the serving cell corresponding to the beam failure candidate reference signal.

When the candidate reference signal set includes both a serving cell measurement reference signal and a non-serving cell measurement reference signal, the terminal preferably selects the serving cell measurement reference signal, and when the terminal cannot select the serving cell measurement reference signal, the terminal selects the non-serving cell measurement reference signal, where the non-serving cell measurement reference signal includes one of the following: a mobility measurement reference signal configured in the MeasObject or a mobility measurement reference signal that is configured in the MeasObject and corresponds to a PCI that does not belong to the predetermined PCI set.

When a new reference signal resource selected from the candidate reference signal resource set belongs to the reference signal in the serving cell, a first quasi co-location relationship is established from a first predetermined duration after a first time instant, and when the new reference signal resource selected from the candidate reference signal resource set belongs to the mobility measurement reference signal resource, the first quasi co-location relationship is established from a second predetermined duration after the first time instant, where the first quasi co-location relationship includes a quasi co-location relationship satisfied by the demodulation reference signal of the CORESET associated with the beam failure search space and the new reference signal resource, and a quasi co-location relationship satisfied by the demodulation reference signal of the PDSCH scheduled in the CORESET associated with the beam failure search space and the new reference signal resource. For the beam failure process of the primary serving cell, the first time instant includes the time instant when the terminal sends the new reference signal resource indication information (that is, the PRACH) to the base station, and for the beam failure process of the secondary serving cell, the first time instant includes a start time instant of response information to the new reference signal indication information.

Figure 3:
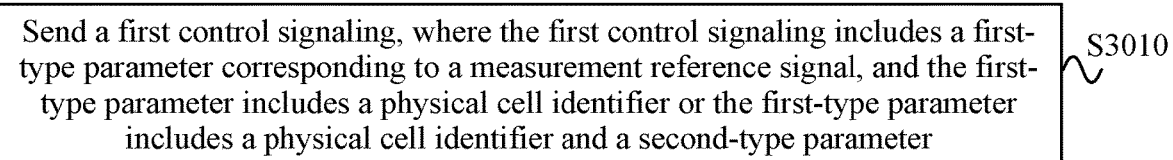
FIG. 3 is a flowchart of a method for sending a control signaling according to an embodiment.

FIG. 3 is a flowchart of a method for sending a control signaling according to an embodiment. As shown in FIG. 3, the method provided in this embodiment includes operation S3010.

In operation S3010, a first control signaling is sent, where the first control signaling includes a first-type parameter corresponding to a measurement reference signal, and the first-type parameter includes a PCI or the first-type parameter includes a PCI and a second-type parameter.

The method for sending a control signaling provided in this embodiment is executed by a second communication node in a wireless communication network, where the second communication node is a node that sends the control signaling to a first communication node to complete various traffics in the wireless communication network, the first communication node is, for example, a terminal, and the second communication node is, for example, a base station. The method for sending a control signaling provided in this embodiment is the processing of the base station side corresponding to the method for receiving a control signaling shown in FIG. 1. The base station side needs to send the first control signaling to a first communication node, where the first control signaling includes the first-type parameter, and after the first communication node receives the first control signaling, the first communication node may determine the measurement reference signal according to the first-type parameter to complete the measurement. The measurement reference signal determined according to the first-type parameter is not only the measurement reference signal of the serving cell, but also another measurement reference signal corresponding to the first-type parameter. Then the first communication node may perform mobility measurement according to the measurement reference signal of a non-serving cell, and the mobility measurement result may be sent through a physical layer signaling to the second communication node of a network layer, that is, to the base station, thereby reducing the report delay of the mobility measurement result. The relevant information of the first control signaling has been described in the embodiment shown in FIG. 1, and details will not be repeated herein.

In the method for sending a control signaling provided in this embodiment, the first control signaling including the first-type parameter corresponding to the measurement reference signal is included, where the first-type parameter includes the PCI or the first-type parameter includes the PCI and the second-type parameter. In this manner, the node that receives the first control signaling may determine the measurement reference signal according to the first-type parameter for mobility measurement and report the measurement result through the physical layer, and since the delay of the measurement result reported through the physical layer is low, the report delay of the mobility measurement result is reduced, thereby improving the cell handover speed.

FIG. 4 is another flowchart of a method for sending a control signaling according to an embodiment. As shown in FIG. 4, the method provided in this embodiment includes operations S4010 and S4020.

In operation S4010, a first control signaling is sent, where the first control signaling includes a first-type parameter corresponding to a measurement reference signal, and the first-type parameter includes a PCI or the first-type parameter includes a PCI and a second-type parameter.

In operation S4020, a second control signaling is sent, where the second control signaling includes indication information, and the indication information is used for indicating that the first control signaling includes the first-type parameter corresponding to the measurement reference signal or that the first control signaling includes a serving cell index corresponding to the measurement reference signal.

The method for sending a control signaling provided in this embodiment is the processing of the second communication node (that is, the base station side) corresponding to the method for receiving a control signaling shown FIG. 2. The specific implementation of the method has been described in detail in the embodiment shown in FIG. 2, and details will not be repeated herein.

FIG. 5 is another flowchart of a method for receiving a control signaling according to an embodiment. As shown in FIG. 5, the method provided in this embodiment includes operation S5010.

In operation S5010, a control signaling is received, where the control signaling includes a PUCCH resource, the control signaling includes a control signaling for configuring one of measurement configuration or a measurement link, and one measurement link includes one measurement object and one piece of report configuration.

In the embodiment shown in FIG. 1, the first control signaling includes the first-type parameter so that the first communication node that receives the first control signaling may perform mobility measurement and report the measurement result through the physical layer, thereby reducing the report delay of the mobility measurement result. In this embodiment, the control signaling includes the PUCCH resource so that the first communication node that receives the control signaling may report the mobility measurement result on the PUCCH resource, thereby achieving the purpose of reducing the report delay of the mobility measurement result. The first control signaling includes a control signaling for configuring one of measurement configuration or a measurement link, and one measurement link includes one measurement object and one piece of report configuration.

FIG. 6 is another flowchart of a method for sending a control signaling according to an embodiment. As shown in FIG. 6, the method provided in this embodiment includes operation S6010.

In operation S6010, a control signaling is sent, where the control signaling includes a PUCCH resource, the control signaling includes a control signaling for configuring one of measurement configuration or a measurement link, and one measurement link includes one measurement object and one piece of report configuration.

The method for sending a control signaling provided in this embodiment is the processing of the base station side corresponding to the method for receiving a control signaling in shown FIG. 5. The implementation principle and effects of these two methods are similar, and details will not be repeated herein.

On the embodiments shown in FIGS. 5 and 6, the control signaling includes at least one of the following pieces of information corresponding to the PUCCH resource: a serving cell index, a PUCCH resource index or a time domain characteristic of the PUCCH resource.

On the embodiments shown in FIGS. 5 and 6, the PUCCH resource is a PUCCH resource where the mobility measurement result is located.

FIG. 7 is a flowchart of a method for transmitting a control signaling according to an embodiment. As shown in FIG. 7, the method provided in this embodiment includes operation S7010.

In operation S7010, an uplink control signaling is transmitted, where the plink control signaling includes a measurement result of the measurement reference signal, and the uplink control signaling includes one of the following: a UCI or a MAC-CE.

The method for transmitting a control signaling provided in this embodiment may be executed by a receiving party in a wireless communication network, that is, by the first communication node, and may also be executed by a sending party, that is, by the second communication node. At the receiving party, the transmission of the uplink control signaling is the receiving of the uplink control signaling, and at the sending party, the transmission of the uplink control signaling is the sending of the uplink control signaling. The measurement result including the mobility measurement reference signal is transmitted in the UCI or the MAC-CE, thereby reducing the report delay of the mobility measurement result and improving the cell handover speed.

On the basis of the embodiment shown in FIG. 7, the uplink control signaling includes the following information: a measurement configuration index, a measurement link index, a measurement object index, a serving cell measurement result list, a neighboring cell measurement result list, a physical cell identifier measurement result list or a fifth-type parameter measurement result list. The serving cell measurement result list includes one or more serving cell measurement results, and one serving cell measurement result includes at least one of the following pieces of information: a serving cell index, cell measurement information corresponding to a serving cell or cell measurement information corresponding to the best neighboring cell. The neighboring cell measurement result list includes one or more neighboring cell measurement results, and one neighboring cell measurement result includes at least one of the following pieces of information: a PCI or cell measurement information corresponding to a neighboring cell. The fifth-type parameter measurement result list includes one or more fifth-type parameter measurement results, and one fifth-type parameter measurement result includes at least one of the following pieces of information: a fifth-type parameter or cell measurement information corresponding to the fifth-type parameter, where the fifth-type parameter includes one of the following: a PCI, a PCI and a measurement object index, or a PCI and a measurement link index.

Figures 8, 9:
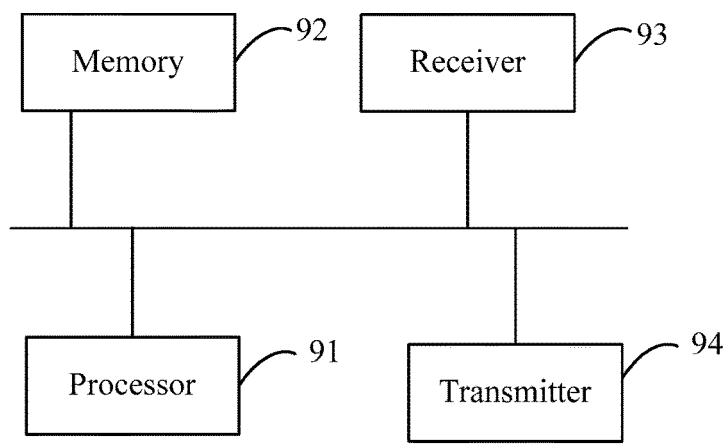
FIG. 8 is a flowchart of a method for determining cell measurement information according to an embodiment.
FIG. 9 is a structural diagram of a communication node according to an embodiment.

FIG. 8 is a flowchart of a method for determining cell measurement information according to an embodiment. As shown in FIG. 8, the method provided in this embodiment includes operation S8010.

In operation S8010, in a case where one serving cell corresponds to multiple PCIs, one or more of the multiple PCIs are selected according to a predetermined rule to determine cell measurement information of the serving cell.

The method for determining cell measurement information provided in this embodiment may be executed by a receiving party in a wireless communication network, that is, by the first communication node, and may also be executed by a sending party, that is, by the second communication node. In a case where one serving cell corresponds to multiple PCIs, the relevant information, such as PCI or PCIs that is used for performing measurement on the serving cell, needs to be determined, that is, the cell measurement information needs to be determined.

The predetermined rule includes one of the following rules.

The cell measurement information of the serving cell is obtained according to a mobility measurement reference signal corresponding to one of the multiple PCIs; a cell measurement result corresponding to each of the multiple PCIs is included in the cell measurement information of the serving cell; or, the cell measurement information of the serving cell is obtained according to cell measurement information corresponding to one of the multiple PCIs.

The cell measurement information includes at least one of the following pieces of information: an RSRP/RSRQ/SINR corresponding to a cell, a measurement reference signal resource index list, an RSRP/RSRQ/SINR corresponding to a measurement reference signal resource in a measurement reference signal resource list, where the RSRP/RSRQ/SINR corresponding to the cell are obtained based on one or more measurement reference signal resources in the cell, and a measurement reference signal resource in the measurement reference signal resource index list belongs to a measurement reference signal resource set corresponding to the cell.

On the basis of the embodiment shown in FIG. 8, whether a mobility measurement trigger event is satisfied is determined according to the cell measurement information of the serving cell.

FIG. 9 is a structural diagram of a communication node according to an embodiment. As shown in FIG. 9, the communication node includes a processor 91, a memory 92, a receiver 93 and a transmitter 94. The number of the processor 91 in the communication node may be one or more, and one processor 91 is illustrated as an example in FIG. 9. The processor 91 and the memory 92 in the communication node may be connected via a bus or in other manners, and the connection via a bus is illustrated as an example in FIG. 9.

As a computer-readable storage medium, the memory 92 may be configured to store software programs, computer-executable programs and modules, such as program instructions/modules corresponding to the method in the embodiments of the present application shown in FIGS. 1 to 8. The processor 91 is configured to run the software programs, instructions and modules stored in the memory 92 to execute at least one of function applications and data processing of the communication node, that is, to perform the methods described above.

The memory 92 may mainly include a program storage region and a data storage region. The program storage region may store an operating system and an application program required for at least one function, and the data storage region may store data or the like created according to the use of the communication node. In addition, the memory 92 may include a high-speed random-access memory, and may also include a non-volatile memory such as at least one disk memory, flash memory or other non-volatile solid-state memories.

The receiver 93 is a module or device combination for data receiving in the communication node. The transmitter 94 is a module or device combination for data sending in the communication node.

In the methods described in the embodiments of the present application, the uplink control signaling includes the mobility measurement result or the CSI measurement reference signal includes the mobility measurement reference signal or one serving cell corresponds to multiple first-type parameters so that the speeds of inter-cell beam measurement report and inter-cell beam handover are equivalent to the speeds of intra-cell beam measurement report and inter-cell beam handover, effectively supporting high-frequency cell handover and dense cells.

Embodiments of the present application further provide a storage medium including a computer-executable instruction. The computer-executable instruction is used for, when executed by a computer processor, performing a method for receiving a control signaling. The method includes: a first control signaling is received, where the first control signaling includes a first-type parameter corresponding to a measurement reference signal, the first-type parameter includes a PCI or the first-type parameter includes a PCI and a second-type parameter, and the second-type parameter is used for determining the relevant information of the measurement reference signal.

Embodiments of the present application further provide a storage medium including a computer-executable instruction. The computer-executable instruction is used for, when executed by a computer processor, performing a method for sending a control signaling. The method includes: a first control signaling is sent, where the first control signaling includes a first-type parameter corresponding to a measurement reference signal, the first-type parameter includes a PCI or the first-type parameter includes a PCI and a second-type parameter, and the second-type parameter is used for determining the relevant information of the measurement reference signal.

Embodiments of the present application further provide a storage medium including a computer-executable instruction. The computer-executable instruction is used for, when executed by a computer processor, performing a method for receiving a control signaling. The method includes: a first control signaling is received, where the first control signaling includes a PUCCH resource, the first control signaling includes a control signaling for configuring one of measurement configuration or a measurement link, and one measurement link includes one measurement object and one piece of report configuration.

Embodiments of the present application further provide a storage medium including a computer-executable instruction. The computer-executable instruction is used for, when executed by a computer processor, performing a method for sending a control signaling. The method includes: a first control signaling is sent, where the first control signaling includes a PUCCH resource, the first control signaling includes a control signaling for configuring one of measurement configuration or a measurement link, and one measurement link includes one measurement object and one piece of report configuration.

Embodiments of the present application further provide a storage medium including a computer-executable instruction. The computer-executable instruction is used for, when executed by a computer processor, performing a method for transmitting a control signaling. The method includes: an uplink control signaling is transmitted, where the plink control signaling includes a measurement result of the measurement reference signal, and the uplink control signaling includes one of the following: a UCI or a MAC-CE.

Embodiments of the present application further provide a storage medium including a computer-executable instruction, and the computer-executable instruction is used for, when executed by a computer processor, performing a method for determining cell measurement information. The method includes: in a case where one serving cell corresponds to multiple PCIs, one or more of the multiple PCIs are selected according to a predetermined rule to determine cell measurement information of the serving cell.

The term user terminal encompasses any appropriate type of radio user device, such as a mobile phone, a portable data processing apparatus, a portable web browser or a vehicle-mounted mobile station.

In general, multiple embodiments of the present application may be implemented in hardware, a special-purpose circuit, software, logic, or any combination thereof. For example, some aspects may be implemented in hardware while other aspects may be implemented in firmware or software that may be executed by a controller, a microprocessor, or other computing apparatuses, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, micro-codes, firmware instructions, status setting data or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be of any type suitable to the local technical environment such as, but not limited to, a general-purpose computer, a special-purpose computer, a microprocessor, digital signal processing (DSP), an application-specific integrated circuit (ASIC), a field-programmable gate array (FPGA) and a processor based on a multi-core processor architecture.

What is claimed is:

1. A method for receiving control signaling, comprising:
receiving, by a first communication node, a first control signaling, wherein the first control signaling comprises a first-type parameter for each measurement reference signal resource in a measurement reference signal resource set, and the first-type parameter comprises a physical cell identifier (PCI), wherein the measurement reference signal resource set comprises measurement reference signal resources configured with different PCIs;
receiving, by the first communication node, the measurement reference signal in the measurement reference signal resource set;
obtaining, by the first communication node, a measurement result according to the determined measurement reference signal; and
sending, by the first communication node, the measurement result through a physical layer signaling to a second communication node, wherein the measurement result comprises an index of a selected measurement reference signal resource selected from the measurement reference signal set; and
wherein the measurement reference signal set comprises one of the following: a measurement reference signal resource set in a report configuration of channel state information (CSI), a measurement reference signal resource set with the measurement result comprised in uplink control information (UCI), or a measurement reference signal resource set configured in a serving cell.

2. The method according to claim 1, comprising:
comprising the index of the selected measurement reference signal resource in the UCI or in a media access control-control element (MAC-CE) for the sending, wherein the measurement reference signal resource is selected from the measurement reference signal resource set according to one of the following manners:
selecting the measurement reference signal resource from the measurement reference signal resource set according to a power difference between the measurement reference signal resources configured with different PCIs;
ignoring transmitting power of the measurement reference signal resource, and selecting the measurement reference signal resource from the measurement reference signal resource set; or,
acquiring a transmitting power of a measurement reference signal resource corresponding to each of the PCIs configured for measurement reference signal resources in the measurement reference signal resource set, and selecting the measurement reference signal resource from the measurement reference signal resource set according to a transmitting power of the measurement reference signal resource and receiving performance of the measurement reference signal at the first communication node.

3. The method according to claim 1, further comprising:
the serving cell corresponds to a plurality of PCIs, a cell measurement information of the serving cell is determined according to one of the following manners:
obtaining the cell measurement information of the serving cell according to a mobility measurement reference signal corresponding to one of the plurality of PCIs;
comprising a cell measurement result corresponding to each of the plurality of PCIs in the cell measurement information of the serving cell; or,
obtaining the cell measurement information of the serving cell according to cell measurement information corresponding to one of the plurality of PCIs.

4. The method according to claim 3, wherein the cell measurement information comprises at least one of the following pieces of information: a reference signal received power (RSRP) corresponding to a cell, a reference signal receiving quality (RSRQ) corresponding to the cell, a signal-to-interference-plus-noise ratio (SINR) corresponding to the cell, a measurement reference signal resource index list, an RSRP corresponding to a measurement reference signal resource in a measurement reference signal resource list, an RSRQ corresponding to the measurement reference signal resource in the measurement reference signal resource list or a SINR corresponding to the measurement reference signal resource in the measurement reference signal resource list, wherein at least one of the RSRP corresponding to the cell, the RSRQ corresponding to the cell or the SINR corresponding to the cell is obtained based on at least one measurement reference signal resource in the cell, and a measurement reference signal resource in the measurement reference signal resource index list belongs to the measurement reference signal resource set corresponding to the cell.

5. The method according to claim 3, further comprising:
determining whether a trigger event is satisfied according to the cell measurement information of the serving cell, and in response to the trigger event being satisfied, sending a mobility measurement result, wherein the mobility measurement result is comprised in one of the following: the UCI, an uplink MAC-CE signaling or uplink higher-layer information.

6. The method according to claim 1, wherein, the first control signaling further comprises the PCI for a beam failure candidate reference signal resource set, and the method further comprises:
from a predetermined time instant, a demodulation reference signal of a predetermined downlink channel and a mobility measurement reference signal in a new measurement reference signal resource satisfy a quasi colocation relationship, wherein the mobility measurement reference signal is a reference signal in the new measurement reference signal resource configured with the PCI, and the new measurement reference signal resource is a measurement reference signal resource selected by the first communication node from the beam failure candidate reference signal resource set.

7. The method according to claim 6, wherein the PCI is a PCI of a non-serving cell.

8. The method according to claim 1, wherein the first control signaling comprises at least one of the following:
a CSI report configuration signaling;
a configuration signaling of a measurement reference signal resource set list; or,
a configuration signaling of the measurement reference signal resource set;
and wherein the measurement reference signal resource set list comprises at least one the measurement reference signal resource set, and the measurement reference signal resource set comprises at least one measurement reference signal resource.

9. The method according to claim 1, wherein: sending the index of the selected measurement reference signal resource from the measurement reference signal resource set in the UCI.

10. The method of claim 1, further comprising:
the measurement result of the measurement reference signal is comprised in an uplink control signaling, determining whether a measurement timing of the measurement reference signal is limited according to whether the first-type parameter corresponding to the measurement reference signal belongs to a predetermined first-type parameter set;

wherein the uplink control signaling comprises one of the following: the UCI or an uplink MAC-CE, wherein the method further comprises at least one of the following:

the first-type parameter belongs to the predetermined first-type parameter set, the measurement timing of the measurement reference signal is not limited; or, the first-type parameter does not belong to the predetermined first-type parameter set, the measurement timing of the measurement reference signal is limited;

wherein each first-type parameter in the predetermined first-type parameter set is associated with the serving cell, the measurement timing is limited in one of the following manners: the measurement timing of the measurement reference signal falls in a measurement gap or a synchronization signal in the measurement reference signal falls in a synchronization signal/physical broadcast channel block measurement timing configuration (SMTC) time window.

11. The method of claim 1, wherein the first-type parameter further comprises a second-type parameter, and wherein the second-type parameter comprises an absolute radio-frequency channel number (ARFCN).

12. The method according of claim 1, wherein the measurement reference signal resource set comprises at least one of a channel state information-reference signal (CSI-RS) resource set; or, a synchronization signal resource set.

13. A method for sending control signaling, comprising:

sending, by a second communication node, a first control signaling, wherein the first control signaling comprises a first-type parameter for each measurement reference signal resource in a measurement reference signal resource set, the first-type parameter comprises a physical cell identifier or the first-type parameter comprises a physical cell identifier (PCI), wherein the measurement reference signal resource set comprises measurement reference signal resources configured with different PCIs;

receiving, by the second communication node, a measurement result through a physical layer signaling from a first communication node, wherein the measurement result is obtained by the terminal performing measurement according to determined measurement reference signal, the measurement result comprises an index of a selected measurement reference signal resource selected from the measurement reference signal set; and wherein the measurement reference signal set comprises one of the following: a measurement reference signal resource set in a report configuration of channel state information (CSI), a measurement reference signal resource set with the measurement result comprised in uplink control information (UCI), or a measurement reference signal resource set configured in a serving cell.

14. The method according to claim 13, wherein the first-type parameter further comprises a second-type parameter, and wherein the second-type parameter comprises an absolute radio-frequency channel number (ARFCN).

15. The method according of claim 13, wherein the first control signaling comprises at least one of the following:

a CSI report configuration signaling;

a configuration signaling of a measurement reference signal resource set list; or, a configuration signaling of the measurement reference signal resource set; and wherein the measurement reference signal resource set list comprises at least one the measurement reference signal resource set, and the measurement reference signal resource set comprises at least one measurement reference signal resource.

16. The method according to claim 13, wherein the first control signaling further comprises the PCI for a beam failure candidate reference signal resource set, and the method further comprises:

from a predetermined time instant, a demodulation reference signal of a predetermined downlink channel and a mobility measurement reference signal in a new measurement reference signal resource satisfy a quasi co-location relationship, wherein the mobility measurement reference signal is a reference signal in the new measurement reference signal resource configured with the PCI, and the new measurement reference signal resource is a measurement reference signal resource selected by the first communication node from the beam failure candidate reference signal resource set.

17. A communication node, comprising a processor and a memory, wherein in response to the communication node being a first communication node, the processor is configured to execute program instructions stored in the memory to perform at least one of the following:

receiving a first control signaling, wherein the first control signaling comprises a first-type parameter for each a measurement reference signal resource in a measurement reference signal resource set, and the first-type parameter comprises a physical cell identifier (PCI), wherein the measurement reference signal resource set includes measurement reference signal resources configured with different PCIs, receiving the measurement reference signal in the measurement reference signal resource set; obtaining a measurement result according to the determined measurement reference signal; and sending the measurement result through a physical layer signaling to a second communication node, wherein the measurement result comprises an index of a selected measurement reference signal resource selected from the measurement reference signal set; wherein the measurement reference signal set comprises one of the following: a measurement reference signal resource set in a report configuration of channel state information (CSI), a measurement reference signal resource set with the measurement result comprised in uplink control information (UCI), or a measurement reference signal resource set configured in a serving cell, or, wherein in response to the communication node being a second communication node, the processor is configured to execute program instructions stored in the memory to perform at least one of the following:

sending a first control signaling, wherein the first control signaling comprises a first-type parameter for each measurement reference signal resource in a measurement reference signal resource set, the first-type parameter comprises a physical cell identifier or the first-type parameter comprises a PCI, wherein the measurement reference signal resource set includes measurement reference signal resources configured with different PCIs, receiving a measurement result through a physical layer signaling from a first communication node, wherein the measurement result is obtained by the terminal performing measurement according to determined measurement reference signal, the measurement result comprises an index of a selected measurement reference signal resource selected from the measurement reference signal set; and wherein the measurement reference signal set comprises one of the following: a measurement reference signal resource set in a report configuration of CSI, a measurement reference signal resource set with the measurement result comprised in UCI, or a measurement reference signal resource set configured in a serving cell.

18. The communication node of claim 17, wherein the measurement reference signal resource set comprises at least one of
    a channel state information-reference signal (CSI-RS) resource set; or,
    a synchronization signal resource set.

19. The communication node of claim 17, wherein the first-type parameter further comprises a second-type parameter, and wherein the second-type parameter comprises an ARFCN.

20. The communication node of claim 17, wherein the first control signaling further comprises the PCI for a beam failure candidate reference signal resource set, and from a predetermined time instant, a demodulation reference signal of a predetermined downlink channel and a mobility measurement reference signal in a new measurement reference signal resource satisfy a quasi co-location relationship, wherein the mobility measurement reference signal is a reference signal in the new measurement reference signal resource configured with the PCI, and the new measurement reference signal resource is a measurement reference signal resource selected by the first communication node from the beam failure candidate reference signal resource set.

* * * * *